United States Patent
Yu et al.

(10) Patent No.: US 11,218,181 B2
(45) Date of Patent: Jan. 4, 2022

(54) ADAPTIVE ANTENNA TUNING SYSTEM FOR IMPROVING CELLULAR CALL RECEPTION IN MOBILE DEVICES

(71) Applicant: Apple Inc., Cupertino, CA (US)

(72) Inventors: Dongchang Yu, San Jose, CA (US); Ming Hu, Sunnyvale, CA (US); Hailong Yang, Daly City, CA (US); Tarakkumar G. Dhanani, San Jose, CA (US); Vijay Gadde, San Jose, CA (US); Xueting Liu, San Jose, CA (US); Dikshit Garg, San Jose, CA (US); Neeraj D. Vaghela, San Jose, CA (US); Mohit Narang, Cupertino, CA (US); Sharad Garg, Cupertino, CA (US)

(73) Assignee: Apple, Inc., Cupertino, CA (US)

( * ) Notice: Subject to any disclaimer, the term of this patent is extended or adjusted under 35 U.S.C. 154(b) by 142 days.

(21) Appl. No.: 16/356,986

(22) Filed: Mar. 18, 2019

(65) Prior Publication Data
US 2019/0296789 A1    Sep. 26, 2019

Related U.S. Application Data

(60) Provisional application No. 62/646,246, filed on Mar. 21, 2018.

(51) Int. Cl.
*H04B 1/401* (2015.01)
*H04B 1/00* (2006.01)

(52) U.S. Cl.
CPC .......... *H04B 1/401* (2013.01); *H04B 1/0064* (2013.01)

(58) Field of Classification Search
CPC .............................. H04B 1/0053; H04B 1/006
See application file for complete search history.

(56) References Cited

U.S. PATENT DOCUMENTS 8,971,826 B2    3/2015   Abdul-Gaffoor
9,065,518 B2    6/2015   Asrani
(Continued)

FOREIGN PATENT DOCUMENTS

CN            104901016 A       9/2015

*Primary Examiner* — Wen W Huang
(74) *Attorney, Agent, or Firm* — Kowert, Hood, Munyon, Rankin & Goetzel, P.C.

(57) ABSTRACT

A wireless communication device (UE) may conduct wireless communications using one or more antennas according to multiple radio access technologies (RAT) associated with corresponding operating frequency bands. The UE may perform adaptive antenna tuning, for example, application-based antenna tuning for increasing the operating efficiency of the UE, which may improve user experience. The UE may periodically identify one or more applications running on the UE, the respective RATs that support the (running) applications, and which of the corresponding frequency bands are used by the (running) applications. The UE may determine the tuner device settings for tuning the one or more antenna(s) based on the (running) applications or the type and/or priority of the (running) applications, which RATs support the running applications, which of the corresponding frequency bands are used by the (running) applications, and operating conditions associated with the frequency bands used by the (running) applications.

20 Claims, 15 Drawing Sheets

(56) References Cited

U.S. PATENT DOCUMENTS

| | | | |
|---|---|---|---|
| 9,860,050 B1* | 1/2018 | Noolu | H04B 1/38 |
| 9,979,531 B2 | 5/2018 | Schwent | |
| 2010/0062728 A1* | 3/2010 | Black | H04B 1/18 |
| | | | 455/77 |
| 2013/0322260 A1* | 12/2013 | Yao | H04L 1/00 |
| | | | 370/241 |
| 2014/0044021 A1* | 2/2014 | Alberth, Jr. | H04B 1/18 |
| | | | 370/278 |
| 2015/0162939 A1* | 6/2015 | Tchvertkin | H04B 1/0064 |
| | | | 455/553.1 |
| 2018/0026667 A1* | 1/2018 | Greene | H04B 7/0615 |
| | | | 370/281 |

* cited by examiner

ADAPTIVE ANTENNA TUNING SYSTEM FOR IMPROVING CELLULAR CALL RECEPTION IN MOBILE DEVICES

PRIORITY CLAIM

This application claims benefit of priority of U.S. Provisional Patent Application Ser. No. 62/646,246 titled "Adaptive Antenna Tuning System for Improving Cellular Call Reception in Mobile Devices", filed on Mar. 21, 2018, which is hereby incorporated by reference as though fully and completely set forth herein.

FIELD OF THE INVENTION

The present application relates to wireless communications, and more particularly to antenna tuning during wireless communications, for example during 3GPP LTE and/or 5G-NR communications.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities.

Long Term Evolution (LTE) has become the technology of choice for the majority of wireless network operators worldwide, providing mobile broadband data and high-speed Internet access to their subscriber base. A proposed next telecommunications standard moving beyond the current International Mobile Telecommunications-Advanced (IMT-Advanced) Standards is called 5th generation mobile networks or 5th generation wireless systems, or 5G for short (otherwise known as 5G-NR for 5G New Radio, also simply referred to as NR). 5G-NR proposes a higher capacity for a higher density of mobile broadband users, also supporting device-to-device, ultra-reliable, and massive machine communications, as well as lower latency and lower battery consumption, than current LTE standards. Additionally, there exist numerous other different wireless communication technologies and standards. Some examples of wireless communication standards in addition to those mentioned above include GSM, UMTS (WCDMA, TDS-CDMA), LTE Advanced (LTE-A), HSPA, 3GPP2 CDMA2000 (for example, 1×RTT, 1×EV-DO, HRPD, eHRPD), IEEE 802.11 (WLAN or Wi-Fi), IEEE 802.16 (WiMAX), BLUETOOTH™, etc.

The ever increasing number of features and functionality introduced in wireless communication devices also creates a continuous need for improvement in both wireless communications and in wireless communication devices. In particular, it is important to ensure the accuracy of transmitted and received signals through user equipment (UE) devices, for example, through wireless devices such as cellular phones, base stations and relay stations used in wireless cellular communications. In addition, increasing the functionality of a UE device can place a significant strain on the battery life of the UE device. Thus it is very important to also reduce power requirements in UE device designs while allowing the UE device to maintain good transmit and receive abilities for improved communications.

The UEs, which may be mobile telephones or smart phones, portable gaming devices, laptops, wearable devices, PDAs, tablets, portable Internet devices, music players, data storage devices, or other handheld devices, etc. may have multiple radio interfaces that enable support of multiple radio access technologies (RATs) as defined by the various wireless communication standards (LTE, LTE-A, 5G-NR, Wi-Fi, BLUETOOTH™, etc.). The radio interfaces, which oftentimes use shared antennas, may be used by various applications and the presence of the multiple radio interfaces may necessitate the UE to implement solutions to seamlessly run applications simultaneously over multiple radio interfaces (for example, over LTE/LTE-A and BLUETOOTH™) without impacting the end-to-end performance of the application. That is, the UE may need to implement solutions to simultaneously operate multiple radio interfaces corresponding to multiple RATs (for example, LTE/LTE-A, 5G-NR, Wi-Fi, BLUETOOTH™, etc.).

One solution aimed at improving device functionality is antenna tuning. As wireless devices, such as those mentioned above for example, continue to evolve to support multiple wireless technologies that use shared antenna(s), the use of antenna tuning (for example the tuning of antenna(s) based on a variety of factors) has become an important tool for improving the overall performance of mobile devices. In one aspect, antenna tuning helps recover performance lost due to the ever shrinking volume or size of physical antennas. In many systems, antenna tuning involves the use of dynamic tuning techniques that improve antenna performance. Antenna tuning can include dynamic impedance tuning and/or aperture tuning. In impedance tuning, the impedance of the radio frequency (RF) front end circuit, for example the interface of the RF front end circuit communicatively coupled to the antenna(s), is tuned, to improve system efficiency. In aperture tuning, the antenna radiation is adjusted without actually having to modify the structure of the antenna, to improve antenna radiation efficiency. Antenna tuning therefore enables smaller antennas to operate more efficiently, facilitating the design of slimmer and thinner antennas.

Since the radio frequencies or frequency bands of operation of the different wireless technologies (or RATs) are often different while using shared antenna(s) within a device, the antenna efficiency depends on the frequency of operation and the antenna tuning. Therefore, where multiple wireless technologies are active (operating) at the same time, the tuning of antenna(s) for one active wireless technology can impact the performance of other active wireless technologies within the device. The extent and focus of the tuning can greatly vary depending on the operational needs and use of the device, and determining the most appropriate or most efficient antenna tuning in any given scenario remains a challenging task.

Other corresponding issues related to the prior art will become apparent to one skilled in the art after comparing such prior art with the disclosed embodiments as described herein.

SUMMARY OF THE INVENTION

Embodiments are presented herein of, inter alia, methods for adaptive, dynamic applications-based and/or service-based antenna tuning in devices for efficient and reliable wireless communications, for example LTE and/or 5G-NR cellular communications. Embodiments are further presented herein for wireless communication systems containing user equipment (UE) devices and/or base stations and/or access point devices communicating with each other within the wireless communication systems according to, inter alia, various principles of adaptive, dynamic antenna tuning as disclosed herein.

As previously mentioned, many wireless devices (for example iPhones, iPads, etc.) support multiple wireless technologies such as Wi-Fi, BLUETOOTH™, GPS (global positioning system), cellular, etc., using shared antenna(s). It may therefore become useful and beneficial to tune the antenna(s) based on the applications and/or services or the type of the applications and/or services (for example voice calls, data streaming, navigation, etc.) being used by the device (for example a wireless communication device/user equipment device, or UE for short) and the wireless technology used to support these applications, in order to improve the performance for all applications/services. Accordingly, in some embodiments, antennas may be tuned based at least on the (type of) application/service being used, the wireless technology that supports the applications/services being used, and/or the radio frequency (RF) conditions of the active wireless technologies, for example the wireless technologies being used by the application(s)/service(s).

In order to meet mobile users' need for more data and faster speeds in support of demanding applications, carrier aggregation has been introduced as a key feature in certain wireless communication technologies, for example cellular technologies such as 3GPP LTE and 5G-NR wireless communications. Carrier aggregation (CA) refers to the aggregation of two or more component carriers (CCs) in order to support wider transmission bandwidths, for example bandwidths of up to 100 MHz. A device, for example a wireless communication device (UE) may simultaneously receive or transmit on one or multiple CCs depending on the UE's capabilities. When CA is configured, the UE may maintain one radio resource control (RRC) connection with the network. The serving cell managing the UE's RRC connection is referred to as the primary cell (PCell), with the associated component carriers referred to as the primary component carriers (PCC). Additional carrier cells are referred to as secondary cells (SCells), with the associated component carriers referred to as secondary components carriers (SCC). The SCells together with the PCell may form a set of serving cells. In CA, a UE may be scheduled via the physical download control channel (PDCCH) over multiple serving cells simultaneously. Cross-carrier scheduling with the carrier indicator field (CIF) allows the PDCCH of a serving cell to schedule resources on another serving cell. That is, a UE receiving a downlink assignment on one CC may receive associated data on another CC.

CA, however, results in additional complications with respect to antenna efficiency between PCC and SCC, since CA is more sensitive to LB (low-band) frequencies than MB (mid-band) or HB (high-band) frequencies. Typically, the antenna(s) in a mobile device are re-tuned to (antenna) tuner-device settings associated with LB operation when CA is enabled, for example during operation that features a combination of MB/HB PCC and LB SCC. However, if the device (for example the modem in the device) is using PCC for voice call (for example VoLTE) while using SCC for data, then such a tuning (or tuner-device settings) oftentimes results in degraded voice call service and degraded UL (uplink) transmitter performance. In order to alleviate issues associated with modes of operation such as the one described above, alternative antenna tuning algorithm(s) may be devised and used.

In some embodiments, a new antenna tuning system and method (for example antenna tuning algorithm) may improve operation of wireless devices (for example, mobile devices), and consequently the user experience while operating those devices. A control mechanism in the device, for example a radio frequency (RF) driver (which may be a software driver), may be used to control RF and hardware components in a front-end path (which may include the antenna matching circuits) of the device. The control mechanism may use a system timer to trigger an application programming interface (API) function that monitors and updates the antenna RF tuner device. In some implementations, the timer may be on the order of 100 ms to 1 s. Within the antenna tuning algorithm and code flows, the RF driver (for example, software driver) may have access to information about the operating modes, which may be associated with certain identified services being used, for example VoLTE or data traffic, the operating (frequency) bands, for example LB, MB or HB, and the signal strength indicators, for example RSSI, RSRP, etc. The antenna tuning algorithm may take any or all of these factors into consideration for tuning the antenna(s), or perform antenna tuning, to maintain efficient and reliable device operation, which results in improved user experience. This ensures that antenna tuning takes into account the application(s)/service(s) presently running on the device in addition to other factors, as well as considering the combination of application(s)/service(s) and operating frequency bands and signal conditions.

For example, if the mobile device is on active phone call using VoLTE, and it is operating on MB/HB frequencies, and is also at the edge of cellular coverage area (for example the RSSI value is below −95 dBm), the antenna tuning algorithm may dynamically provide a tuner-setting or tuner device setting(s) determined to provide most efficient device operation under those conditions. As previously mentioned, when CA is enabled, the tuner device settings associated with a combination of MB/HB PCC and LB LCC are similar to tuner device settings associated or consistent with LB operation. However, upon detecting the above operating conditions or combination of operating factors, the antenna tuning algorithm may specify tuner device settings associated or consistent with MB/HB operation to ensure that the antenna efficiency for the VoLTE operation and the transmitter is not degraded. Since the LB SCC is used for data traffic, it is not as sensitive to service interruptions as a voice call (for example it is not prone to dropped calls, etc.) Extensive lab tests and field tests of implementations of an optimized antenna tuning algorithm in an RF software driver have shown improvement in terms of longer phone call service time and/or fewer dropped calls. Detailed test results, for different specific mobile devices and corresponding antenna designs, have shown at least a 3 dB improvement.

In some embodiments, an adaptive antenna tuning flow may optimize performance based on a detection of specific operating modes and/or conditions, for example the detection of specified user scenarios based on the applications running on the UE. Within a mobile device, the antenna tuning flow may have access to information such as operating frequency bands (LB, MB, and HB), the type of data/information traffic (for example, VoLTE or data) pertaining to applications running on the UE, and signal strength (for example, RSSI or RSRP level), and may save that information in its internal local memory or registers. A system timer (e.g. on the order of 100 ms to 1 s, in some embodiments) may trigger a periodic operating mode/condition check, for example via an application programming interface (API) call, or API check. The API call or check may identify an operating frequency range of the PCC, for example whether or not the PCC is operating in a MB/HB frequency band, and may use a first antenna-tuner-setting for tuning the antenna(s) if the PCC operating frequency range is not within a specified range, for example it is not within MB/HB. Otherwise, the API call or check identifies the data traffic mode of the PCC, for example whether the PCC is operating in VoLTE mode (e.g., VoLTE services are using the PCC), or more generally, which application(s) running on the UE is (are) using the PCC, and may use the first antenna-tuner-setting for tuning the antenna(s) if the PCC is not operating in a specified data traffic mode, for example if the PCC is not operating in VoLTE mode. Otherwise, the API call or check may identify the signal conditions, for example whether the RSSI (receiver signal strength indicator) is below certain threshold, for example −95 dBm, and may use the first antenna-tuner-setting if the signal conditions are not within specified limits, for example if the RSSI is below the threshold. Otherwise, the API call or check may use a second antenna-tuner-setting or second set of antenna-tuner-device settings, for example settings that are specific (or corresponding) to the identified operating mode or combination of application/service/operating condition(s) or user scenario. In some embodiments, the tuner device settings may be provided through a specific communication interface to adjust a hardware tuner device that ultimately adjusts the antenna tuning (for example, impedance tuning or aperture tuning). In some embodiments, the first antenna-tuner-device settings (or first antenna-tuner-setting) may be representative of tuner device settings associated with a more general operating mode, while the second antenna-tuner-device settings (or second antenna-tuner-setting) may be representative of tuner device settings more specifically associated with the identified user/operating scenario.

In a more general sense, a UE conducting wireless communications using one or more antennas according to a number of different radio access technologies associated with corresponding operating frequency bands may perform adaptive antenna tuning, e.g. application-based dynamic antenna tuning as follows. The UE may identify one or more applications running on or being executed on the wireless communication device, and may further identify, for each running/executing application, which of the different radio access technologies supports the running application. The UE may also identify, for each running application, which of the operating frequency bands are used by the running/executing application. The UE may tune the one or more antennas based on the respective types of the running/executing applications (e.g. real-time applications, real-time voice application such as VoLTE, real-time audio/video applications, non-real-time data applications, navigation, etc., typically associated with specific types of data/information traffic), the respective operating frequency band(s) used by each running application, and/or the respective signal conditions associated with the one or more frequency bands used by each running application. The UE may tune the antenna(s) based on the various different combinations of running applications (types), supporting radio access technologies, and frequency bands used by the applications.

Note that the techniques described herein may be implemented in and/or used with a number of different types of devices, including but not limited to, base stations, access points, cellular phones, portable media players, tablet computers, wearable devices, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Figure 1:
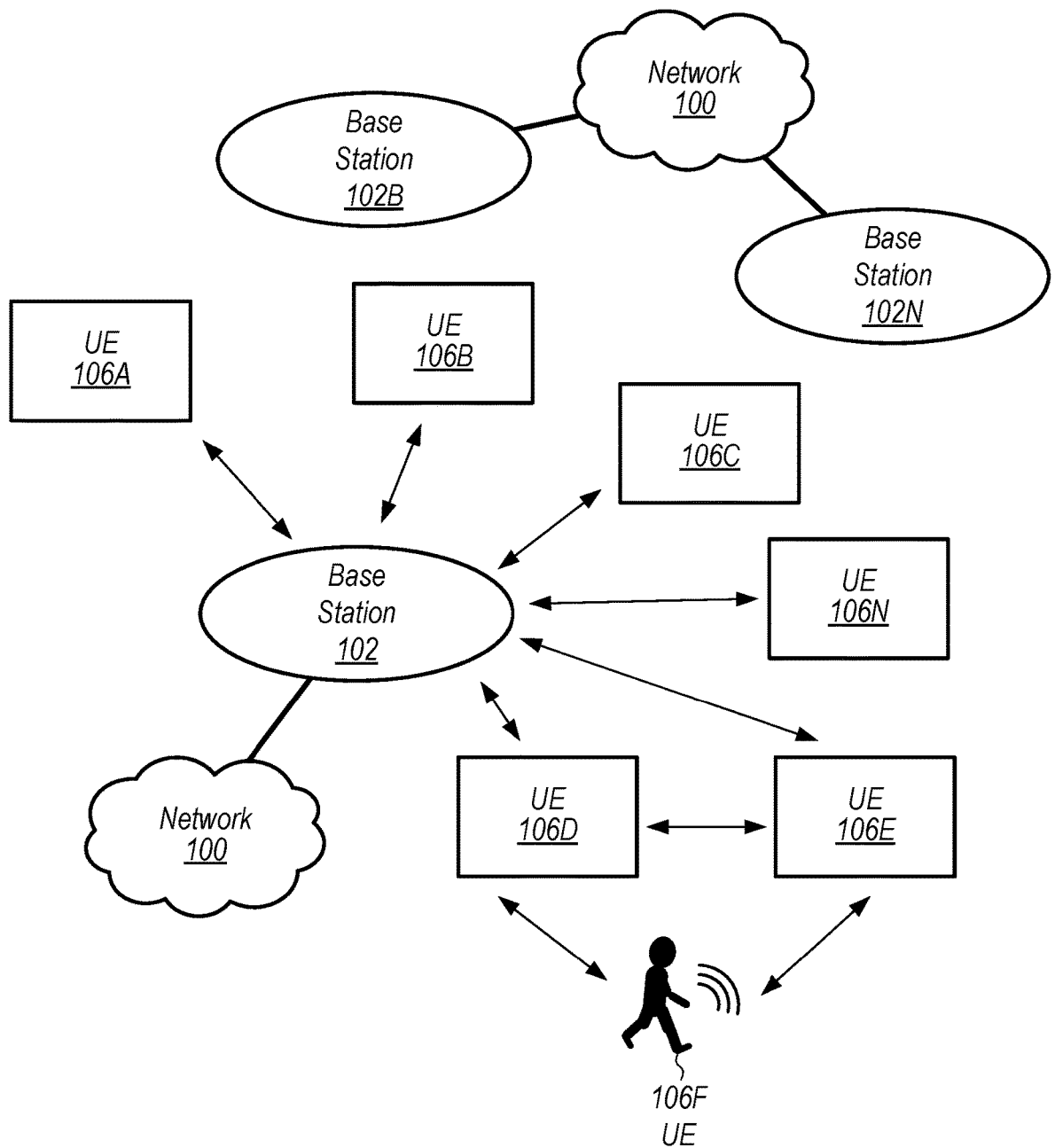
FIG. 1 shows an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Acronyms

Various acronyms are used throughout the present application. Definitions of the most prominently used acronyms that may appear throughout the present application are provided below:

ACK: Acknowledgement
APR: Applications Processor
BLER: Block Error Rate
BS: Base Station
BT: BLUETOOTH™
BSR: Buffer Size Report
CC: Component Carrier
CMR: Change Mode Request
CQI: Channel Quality Indicator
DL: Downlink (from BS to UE)
DYN: Dynamic
FDD: Frequency Division Duplexing
FT: Frame Type
GNSS: Global Navigation Satellite System
GPRS: General Packet Radio Service
GPS: Global Positioning System
GSM: Global System for Mobile Communication
HARQ: Hybrid Automatic Repeat Request
IE: Information Element
LAN: Local Area Network
LBT: Listen Before Talk
LTE: Long Term Evolution
LTE-U: LTE in Unlicensed Spectrum
LAA: License Assisted Access
MAC: Media Access Control (layer)
NACK: Negative Acknowledgement
PCC: Primary Component Carrier
PCell: Primary Cell
PDCCH: Physical Downlink Control Channel
PDSCH: Physical Downlink Shared Channel
PDN: Packet Data Network
PDU: Protocol Data Unit
PUCCH: Physical Uplink Control Channel
QoS: Quality of Service
RAT: Radio Access Technology
RF: Radio Frequency
RSCC: RSRP of SCC
RSRP: Reference Signal Received Power
RTP: Real-time Transport Protocol
RX: Reception/Receive
SCC: Secondary Component Carrier
SCell: Secondary Cell
SNR: Signal to Noise Ratio
SSCC: SNR of SCC
TBS: Transport Block Size
TDD: Time Division Duplexing
TTI: Transmission Time Interval
TX: Transmission/Transmit
UCI: Uplink Control Information
UE: User Equipment (Device)
UL: Uplink (from UE to BS)
UMTS: Universal Mobile Telecommunication System
VoLTE: Voice over LTE
WLAN: Wireless LAN
Wi-Fi: Wireless Local Area Network (WLAN) RAT based on the Institute of Electrical and Electronics Engineers' (IEEE) 802.11 standards Terms The following is a glossary of terms that may appear in the present application:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices including multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems devices which perform wireless communications. Also referred to as wireless communication devices, many of which may be mobile and/or portable. Examples of UE devices include mobile telephones or smart phones (e.g., iPhone™, Android™-based phones) and tablet computers such as iPad™, Samsung Galaxy™, etc., gaming devices (e.g. Sony Play Station™, Microsoft XBox™, etc.), portable gaming devices (e.g., Nintendo DS™, PlayStation Portable™, Gameboy Advance™, iPod™), laptops, wearable devices (e.g. Apple Watch™, Google Glass™), PDAs, portable Internet devices, music players, data storage devices, or other handheld devices, etc. Various other types of devices would fall into this category if they include Wi-Fi or both cellular and Wi-Fi communication capabilities and/ or other wireless communication capabilities, for example over short-range radio access technologies (SRATs) such as BLUETOOTH™, etc. In general, the term "UE" or "UE device" may be broadly defined to encompass any electronic, computing, and/or telecommunications device (or combination of devices) which is capable of wireless communication and may also be portable/mobile.

Wireless Device (or wireless communication device)—any of various types of computer systems devices which performs wireless communications using WLAN communications, SRAT communications, Wi-Fi communications and the like. As used herein, the term "wireless device" may refer to a UE device, as defined above, or to a stationary device, such as a stationary wireless client or a wireless base station. For example a wireless device may be any type of wireless station of an 802.11 system, such as an access point (AP) or a client station (UE), or any type of wireless station of a cellular communication system communicating according to a cellular radio access technology (e.g. LTE, CDMA, GSM), such as a base station or a cellular telephone, for example.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)—The term "Base Station" has the full breadth of its ordinary meaning, and at least includes a wireless communication station installed at a fixed location and used to communicate as part of a wireless telephone system or radio system.

Processor—refers to various elements (e.g. circuits) or combinations of elements that are capable of performing a function in a device, e.g. in a user equipment device or in a cellular network device. Processors may include, for example: general purpose processors and associated memory, portions or circuits of individual processor cores, entire processor cores or processing circuit cores, processing circuit arrays or processor arrays, circuits such as ASICs (Application Specific Integrated Circuits), programmable hardware elements such as a field programmable gate array (FPGA), as well as any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Station (STA)—The term "station" herein refers to any device that has the capability of communicating wirelessly, e.g. by using the 802.11 protocol. A station may be a laptop, a desktop PC, PDA, access point or Wi-Fi phone or any type of device similar to a UE. An STA may be fixed, mobile, portable or wearable. Generally in wireless networking terminology, a station (STA) broadly encompasses any device with wireless communication capabilities, and the terms station (STA), wireless client (UE) and node (BS) are therefore often used interchangeably.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

FIG. 1—Exemplary Communication System

FIG. 1 illustrates an exemplary (and simplified) wireless communication system, according to some embodiments. It is noted that the system of FIG. 1 is merely one example of a possible system, and embodiments may be implemented in any of various systems, as desired.

As shown, the exemplary wireless communication system includes a base station 102 which communicates over a transmission medium with one or more user devices 106A, 106B, etc., through 106-N. Each of the user devices may be referred to herein as a "user equipment" (UE) or UE device. Thus, the user devices 106 are referred to as UEs or UE devices. Various ones of the UE devices may perform adaptive antenna tuning, e.g. dynamic application-based/ services-based antenna tuning as detailed herein.

The base station 102 may be a base transceiver station (BTS) or cell site, and may include hardware that enables wireless communication with the UEs 106A through 106N. The base station 102 may also be equipped to communicate with a network 100, e.g., a core network of a cellular service provider, a telecommunication network such as a public switched telephone network (PSTN), and/or the Internet, neutral host or various CBRS (Citizens Broadband Radio Service) deployments, among various possibilities. Thus, the base station 102 may facilitate communication between the user devices and/or between the user devices and the network 100. The communication area (or coverage area) of the base station may be referred to as a "cell." It should also be noted that "cell" may also refer to a logical identity for a given coverage area at a given frequency. In general, any independent cellular wireless coverage area may be referred to as a "cell". In such cases a base station may be situated at particular confluences of three cells. The base station, in this uniform topology, may serve three 120 degree beam width areas referenced as cells. Also, in case of carrier aggregation, small cells, relays, etc. may each represent a cell. Thus, in carrier aggregation in particular, there may be primary cells and secondary cells which may service at least partially overlapping coverage areas but on different respective frequencies. For example, a base station may serve any number of cells, and cells served by a base station may or may not be collocated (e.g. remote radio heads). As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network, and may further also be considered at least a part of the UE communicating on the network or over the network.

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, 5G-NR, 3GPP2 CDMA2000 (e.g., 1×RTT, 1×EV-DO, HRPD, eHRPD), Wi-Fi, WiMAX etc. Note that if the base station 102A is implemented in the context of LTE, it may alternately be referred to as an 'eNodeB' or 'eNB'. Note that if the base station 102A is implemented in the context of 5G NR, it may alternately be referred to as 'gNodeB' or 'gNB'. In some embodiments, the base station 102 may communicate with at least one UE or a group of UEs using adaptive antenna tuning, e.g. application-based antenna tuning as disclosed herein. Depending on a given application or specific considerations, for convenience some of the various different RATs may be functionally grouped according to an overall defining characteristic. For example, all cellular RATs may be collectively considered as representative of a first (form/type of) RAT, while Wi-Fi communications may be considered as representative of a second RAT. In other cases, individual cellular RATs may be considered individually as different RATs. For example, when differentiating between cellular communications and Wi-Fi communications, "first RAT" may collectively refer to all cellular RATs under consideration, while "second RAT" may refer to Wi-Fi. Similarly, when applicable, different forms of Wi-Fi communications (e.g. over 2.4 GHz vs. over 5 GHz) may be considered as corresponding to different RATs. Furthermore, cellular communications performed according to a given RAT (e.g. LTE or NR) may be differentiated from each other on the basis of the frequency spectrum in which those communications are conducted. For example, LTE or NR communications may be performed over a primary licensed spectrum as well as over a secondary spectrum such as an unlicensed spectrum. Overall, the use of various terms and expressions will always be clearly indicated with respect to and within the context of the various applications/embodiments under consideration.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transmission and reception points (TRPs). In addition, a UE capable of operating according to 5G NR may be connected to one or more TRPs within one or more gNBs.

As mentioned above, UE 106 may be capable of communicating using multiple wireless communication standards. For example, a UE 106 may be configured to communicate using any or all of a 3GPP cellular communication standard (such as LTE and/or 5G-NR) or a 3GPP2 cellular communication standard (such as a cellular communication standard in the CDMA2000 family of cellular communication standards). In some embodiments, the UE 106 may be configured to perform adaptive antenna tuning, e.g. dynamic application-based antenna tuning, at least according to the various methods as described herein. Base station 102 and other similar base stations operating according to the same or a different cellular communication standard may thus be provided as one or more networks of cells, which may provide continuous or nearly continuous overlapping service to UE 106 and similar devices over a wide geographic area via one or more cellular communication standards.

The UE 106 might also or alternatively be configured to communicate using WLAN, BLUETOOTH', BLUETOOTH™ Low-Energy, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible. Furthermore, the UE 106 may also communicate with Network 100, through one or more base stations or through other devices, stations, or any appliances not explicitly shown but considered to be part of Network 100. UE 106 communicating with a network may therefore be interpreted as the UE 106 communicating with one or more network nodes considered to be a part of the network and which may interact with the UE 106 to conduct communications with the UE 106 and in some cases affect at least some of the communication parameters and/or use of communication resources of the UE 106.

As also illustrated in FIG. 1, at least some of the UEs, e.g. UEs 106D and 106E may represent vehicles communicating with each other and with base station 102, e.g. via cellular communications such as 3GPP LTE and/or 5G-NR communications, for example. In addition, UE 106F may represent a pedestrian who is communicating and/or interacting with the vehicles represented by UEs 106D and 106E in a similar manner. Further aspects of vehicles communicating in network exemplified in FIG. 1 will be discussed below, for example in the context of vehicle-to-everything (V2X) communication such as the communications specified by 3GPP TS 22.185 V.14.3.0, among others.

Figure 2:
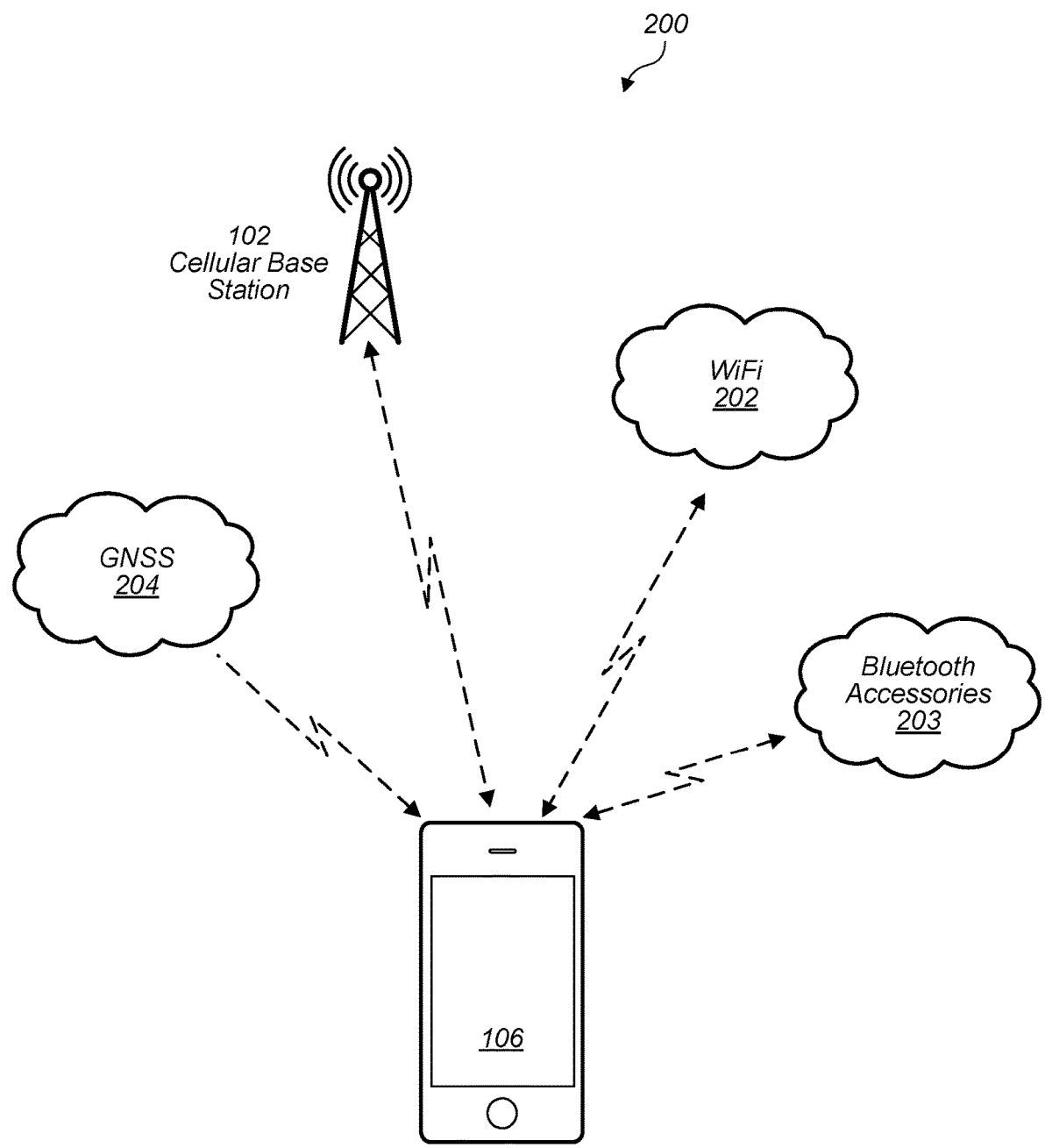
FIG. 2 shows an exemplary wireless communication device (UE) device in communication with various devices operating according to different radio access technologies, according to some embodiments.

FIG. 2—Exemplary Communication System with a Mobile Device

FIG. 2 illustrates an exemplary user equipment 106 (e.g., one of the devices 106-1 through 106-N) in communication with a cellular base station 102, a Wi-Fi router (or access point) 202, BLUETOOTH™ accessories 203 and global navigation satellite system (GNSS)/global positioning system (GPS) satellite 204, according to some embodiments. The UE 106 may be a device with wireless network connectivity such as a mobile phone, a hand-held device, a computer or a tablet, or virtually any type of wireless device. The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, 5G-NR, WLAN, or GNSS. Other combinations of wireless communication standards are also possible. Cellular base station 102 may be capable of supporting various different cellular technologies similar to UE 106, and may be a base transceiver, NodeB, eNodeB, gNodeB or any cellular base station.

The UE 106 may include one or more antennas for communicating using one or more wireless communication protocols according to one or more RAT standards, e.g. those illustrated in FIG. 2. In some embodiments, the UE 106 may share one or more parts of a receive chain and/or transmit chain between multiple wireless communication standards. The shared radio may include a single antenna, or may include multiple antennas (e.g., for MIMO) for performing wireless communications. Alternatively, the UE 106 may include separate transmit and/or receive chains (e.g., including separate antennas and other radio components) for each wireless communication protocol with which it is configured to communicate. As another alternative, the UE 106 may include one or more radios which are shared between multiple wireless communication protocols, and one or more radios which are used exclusively by a single wireless communication protocol. For example, the UE 106 may include a shared radio for communicating using either of LTE or 5G-NR or CDMA2000 1×RTT, and separate radios for communicating using each of Wi-Fi and BLUETOOTH™. Other configurations are also possible.

Figure 3A:
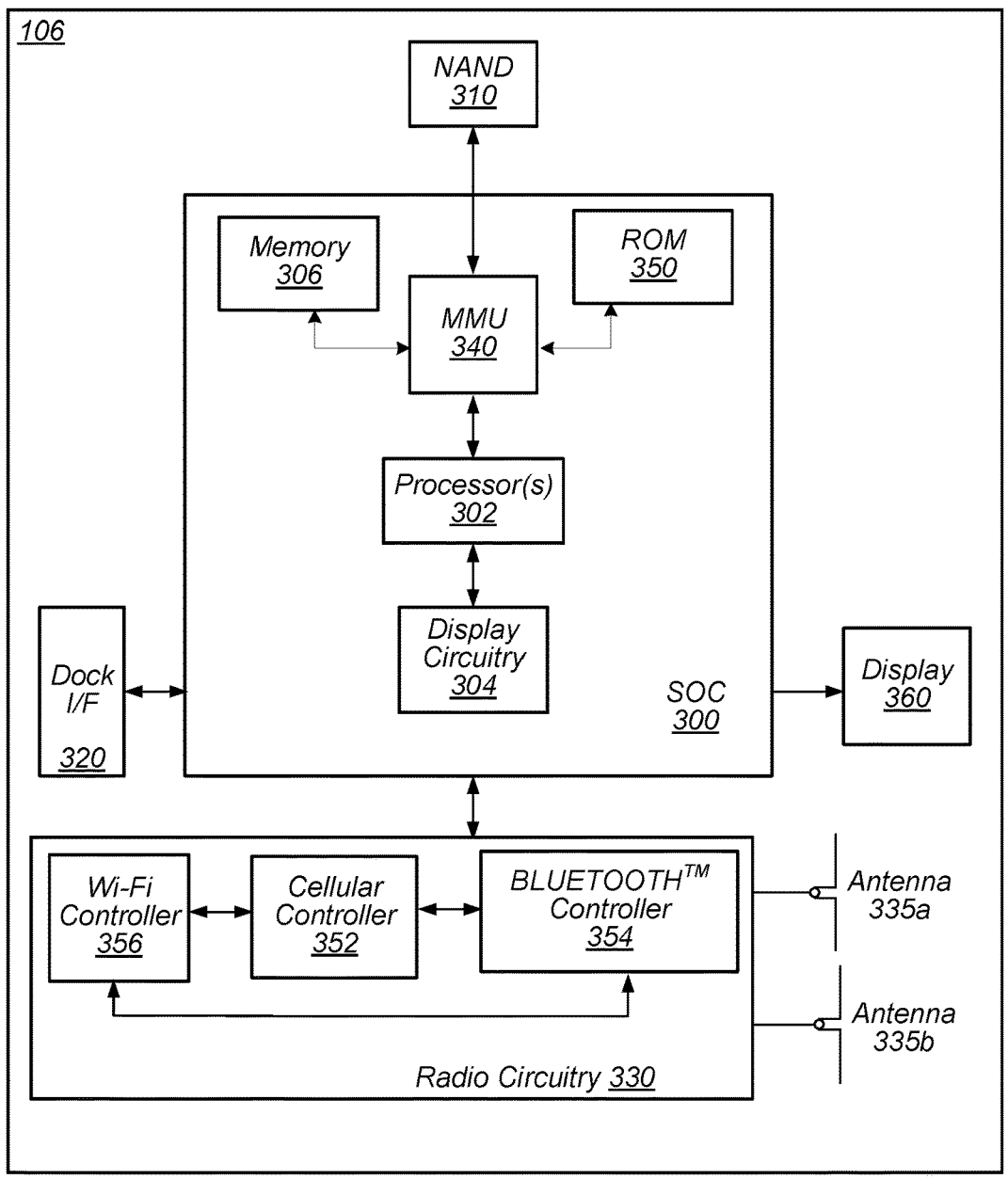
FIG. 3A shows an exemplary (and simplified) system diagram of a UE, according to some embodiments.

FIG. 3A—Block Diagram of an Exemplary UE

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio circuitry 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to the computer system), the display 360, and wireless communication or radio circuitry 330 (e.g., for LTE, LTE-A, CDMA2000, BLUETOOTH™, Wi-Fi, GPS, etc.). The UE device 106 may include at least one antenna (e.g. 335a), and possibly multiple antennas (e.g. illustrated by antennas 335a and 335b), for performing wireless communication with base stations and/or other devices. Antennas 335a and 335b are shown by way of example, and UE device 106 may include fewer or more antennas. Overall, the one or more antennas are collectively referred to as antenna(s) 335. For example, the UE device 106 may use antenna(s) 335 to perform the wireless communication with the aid of radio circuitry 330. As noted above, the UE may be configured to communicate wirelessly using multiple wireless communication standards in some embodiments.

As described further herein, the UE 106 (and/or base station 102) may include hardware and software components for implementing methods for at least UE 106 to perform adaptive antenna tuning, e.g. application-based antenna tuning according to various embodiments detailed herein. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to implement communications by UE 106 that incorporate adaptive antenna tuning, e.g., application-based antenna tuning, according to various embodiments disclosed herein. Specifically, processor(s) 302 may be coupled to and/or may interoperate with other components as shown in FIG. 3 to facilitate UE 106 communicating in a manner that seeks to optimize antenna tuning according to the various embodiments disclosed herein. Processor(s) 302 may also implement various other applications and/or end-user applications running on UE 106. It should also be noted that processor(s) 302 may be representative of multiple processors, interoperable to perform any or all of various applications and end-user applications and/or to perform part or all of the methods described herein.

Figure 5:
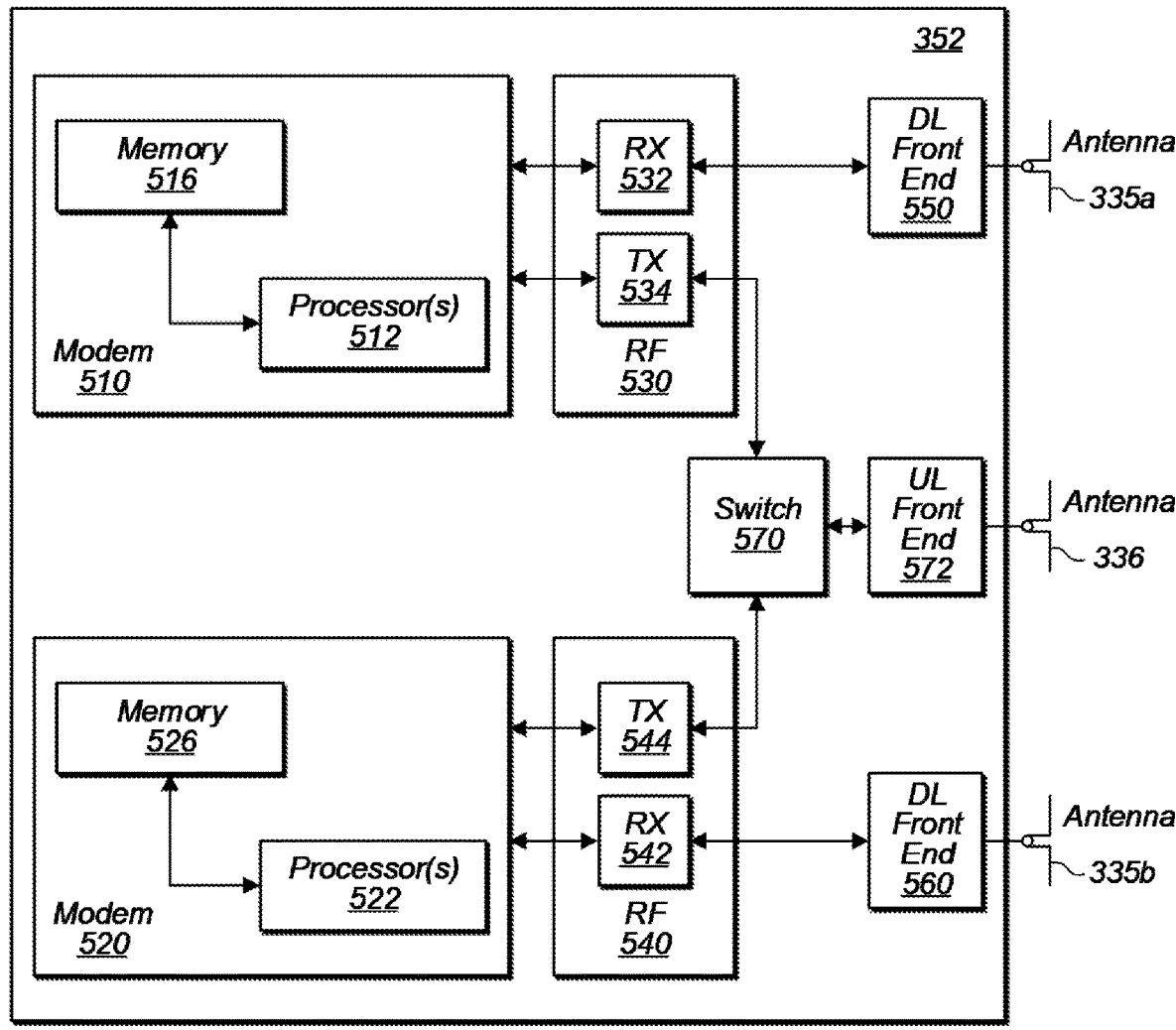
FIG. 5 shows an exemplary simplified block diagram illustrative of cellular communication circuitry, according to some embodiments.

In some embodiments, radio circuitry 330 may include separate controllers dedicated to controlling communications for various respective RAT standards. For example, as shown in FIG. 3, radio circuitry 330 may include a Wi-Fi controller 356, a cellular controller (e.g. LTE/3GPP controller) 352, and BLUETOOTH™ controller 354, and in at least some embodiments, one or more or all of these controllers may be implemented as respective integrated circuits (ICs or chips, for short) in communication with each other and with SOC 300 (and more specifically with processor(s) 302). For example, Wi-Fi controller 356 may communicate with cellular controller 352 over a cell-ISM link or WCI interface, and/or BLUETOOTH™ controller 354 may communicate with cellular controller 352 over a cell-ISM link, etc. While three separate controllers are illustrated within radio circuitry 330, other embodiments have fewer or more similar controllers for various different RATs that may be implemented in UE device 106. For example, at least one exemplary block diagram illustrative of some embodiments of cellular controller 352 is shown in FIG. 5 as further described below.

Figure 3B:
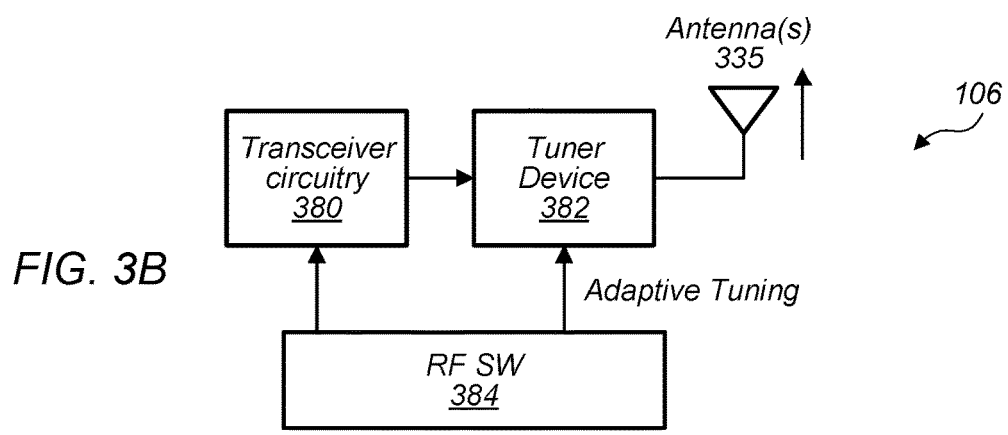
FIG. 3B shows an exemplary (and simplified) system diagram of a UE with an antenna tuning mechanism, according to some embodiments.

FIG. 3B—Block Diagram of an Exemplary UE with and Antenna Tuner Device

FIG. 3B shows an exemplary (and simplified) system diagram of a UE 106 with an antenna tuning mechanism, according to some embodiments. With respect to UE 106 shown in FIG. 3, for example, one functional arrangement within UE 106 for antenna tuning may include transceiver circuitry 380, which may correspond to components within radio circuitry 330, and may further include tuner device 382 interfacing the transceiver circuitry 380 with the antenna(s) 335. Tuner device 382 may be used to perform the actual tuning of antenna(s) 335 based on adaptive tuning, for example application-based adaptive tuning performed by, for example, driver software indicated by RF software block 384. It should be noted that driver block 384 is representative of a control mechanism that determines the antenna-tuner-setting or antenna-tuner-device settings (also referred to as tuner-settings for short) for tuner device 382. Thus, FIG. 3B illustrates but one embodiment in which the antenna tuning control is performed by driver software which may be executed in SOC 300, for example (in reference to FIG. 3). In various embodiments, the control method for determining the tuner-setting (or antenna-tuner-settings or antenna-tuner-device settings) for tuner device 382 may be implemented in driver software or a combination of processors and software as previously discussed above. For various embodiments disclosed herein, the antenna tuning control or generation of the (antenna-) tuner-setting or (antenna-) tuner-device settings is assumed to be obtained by executing an algorithm, for example by executing an application programming interface (API) call or check routine. More detailed embodiments of a UE with adaptive antenna tuning mechanisms are further described below, for example with reference to FIGS. 6 and 7.

Figure 4:
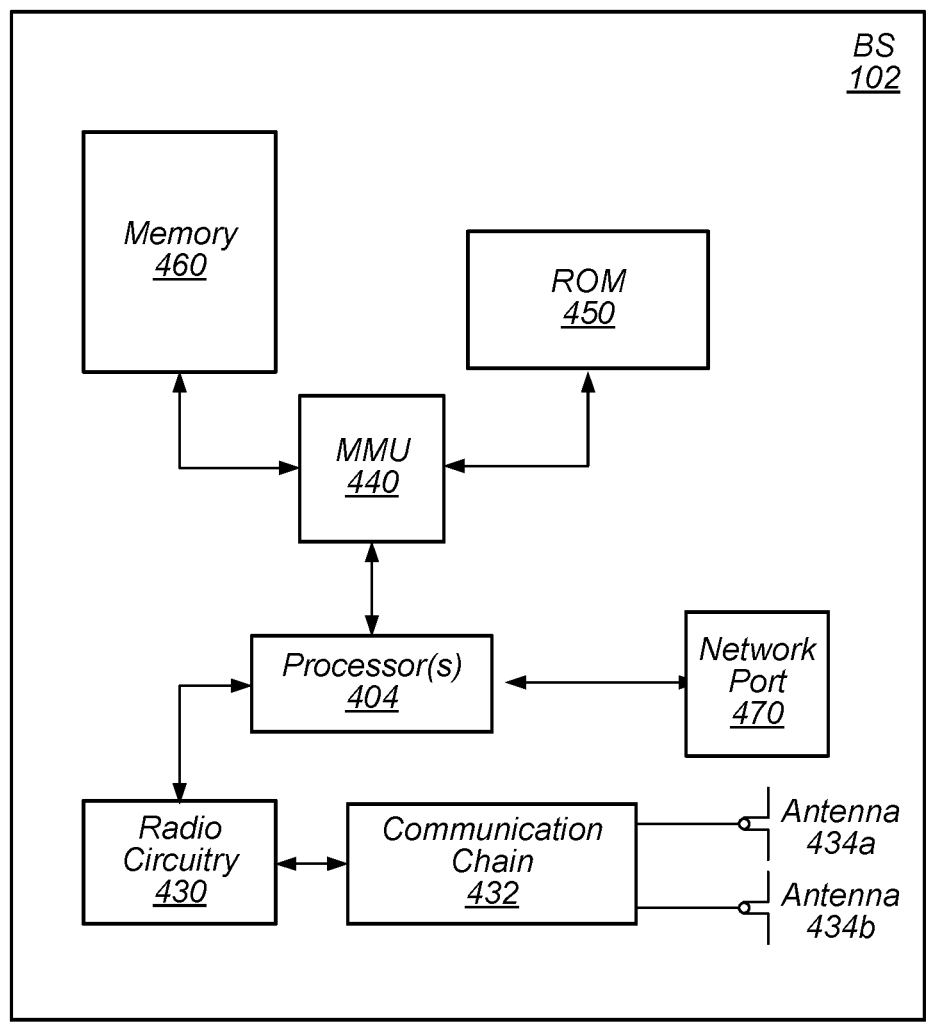
FIG. 4 shows an exemplary (and simplified) system diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434a, and possibly multiple antennas (e.g. illustrated by antennas 434a and 434b), for performing wireless communication with mobile devices and/or other devices. Antennas 434a and 434b are shown by way of example, and base station 102 may include fewer or more antennas. Overall, the one or more antennas are collectively referred to as antenna(s) 434. Antenna(s) 434 may be configured to operate as a wireless transceiver and may be further configured to communicate with UE devices 106 via radio circuitry 430. The antenna(s) 434 communicates with the radio circuitry 430 via communication chain 432. Communication chain 432 may be a receive chain, a transmit chain or both. The radio circuitry 430 may be designed to communicate via various wireless telecommunication standards, including, but not limited to, LTE, LTE-A, 5G-NR, WCDMA, CDMA2000, etc. The processor(s) 404 of the base station 102 may operate by executing program instructions stored on a memory medium (e.g., a non-transitory computer-readable memory medium), for base station 102 to communicate with a UE device that performs adaptive antenna tuning, for example application-based antenna tuning. Alternatively, the processor 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g. it may include at least one Ethernet port, and radio circuitry 430 may be designed to communicate according to the Wi-Fi standard. Base station 102 may operate according to the various methods as disclosed herein for communicating with mobile devices capable of performing adaptive antenna tuning, for example application-based antenna tuning as disclosed herein.

FIG. 5—Exemplary Cellular Communication Circuitry

FIG. 5 illustrates an exemplary simplified block diagram illustrative of cellular controller 352, according to some embodiments. It is noted that the block diagram of the cellular communication circuitry of FIG. 5 is only one example of a possible cellular communication circuit; other circuits, such as circuits including or coupled to sufficient antennas for different RATs to perform uplink activities using separate antennas, or circuits including or coupled to fewer antennas, e.g., that may be shared among multiple RATs, are also possible. According to some embodiments, cellular communication circuitry 352 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 352 may couple (e.g., communicatively; directly or indirectly) to one or more antennas, such as antennas 335a-b and 336 as shown. In some embodiments, cellular communication circuitry 352 may include dedicated receive chains (including and/or coupled to (e.g., communicatively; directly or indirectly) dedicated processors and/or radios) for multiple RATs (e.g., a first receive chain for LTE and a second receive chain for 5G NR). For example, as shown in FIG. 5, cellular communication circuitry 352 may include a first modem 510 and a second modem 520. The first modem 510 may be configured for communications according to a first RAT, e.g., such as LTE or LTE-A, and the second modem 520 may be configured for communications according to a second RAT, e.g., such as 5G NR.

As shown, the first modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, the second modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 352 receives instructions to transmit according to the first RAT (e.g., as supported via the first modem 510), switch 570 may be switched to a first state that allows the first modem 510 to transmit signals according to the first RAT (e.g., via a transmit chain that includes transmit circuitry 534 and UL front end 572). Similarly, when cellular communication circuitry 352 receives instructions to transmit according to the second RAT (e.g., as supported via the second modem 520), switch 570 may be switched to a second state that allows the second modem 520 to transmit signals according to the second RAT (e.g., via a transmit chain that includes transmit circuitry 544 and UL front end 572).

As described herein, the first modem 510 and/or the second modem 520 may include hardware and software components for implementing any of the various features and techniques described herein. The processors 512, 522 may be configured to implement part or all of the features described herein, e.g., by executing program instructions stored on a memory medium (e.g., a non-transitory computer-readable memory medium). Alternatively (or in addition), processors 512, 522 may be configured as a programmable hardware element, such as an FPGA (Field Programmable Gate Array), or as an ASIC (Application Specific Integrated Circuit). Alternatively (or in addition) the processors 512, 522, in conjunction with one or more of the other components 530, 532, 534, 540, 542, 544, 550, 570, 572, 335 and 336 may be configured to implement part or all of the features described herein.

In addition, as described herein, processors 512, 522 may include one or more processors. Thus, processors 512, 522 may include one or more integrated circuits (ICs) that are configured to perform the functions of processors 512, 522. In addition, each integrated circuit may include circuitry (e.g., first circuitry, second circuitry, etc.) configured to perform the functions of processors 512, 522.

In some embodiments, the cellular communication circuitry 352 may include only one transmit/receive chain. For example, the cellular communication circuitry 352 may not include the modem 520, the RF front end 540, the DL front end 560, and/or the antenna 335b. As another example, the cellular communication circuitry 352 may not include the modem 510, the RF front end 530, the DL front end 550, and/or the antenna 335a. In some embodiments, the cellular communication circuitry 352 may also not include the switch 570, and the RF front end 530 or the RF front end 540 may be in communication, for example, directly, with the UL front end 572.

Figure 6:
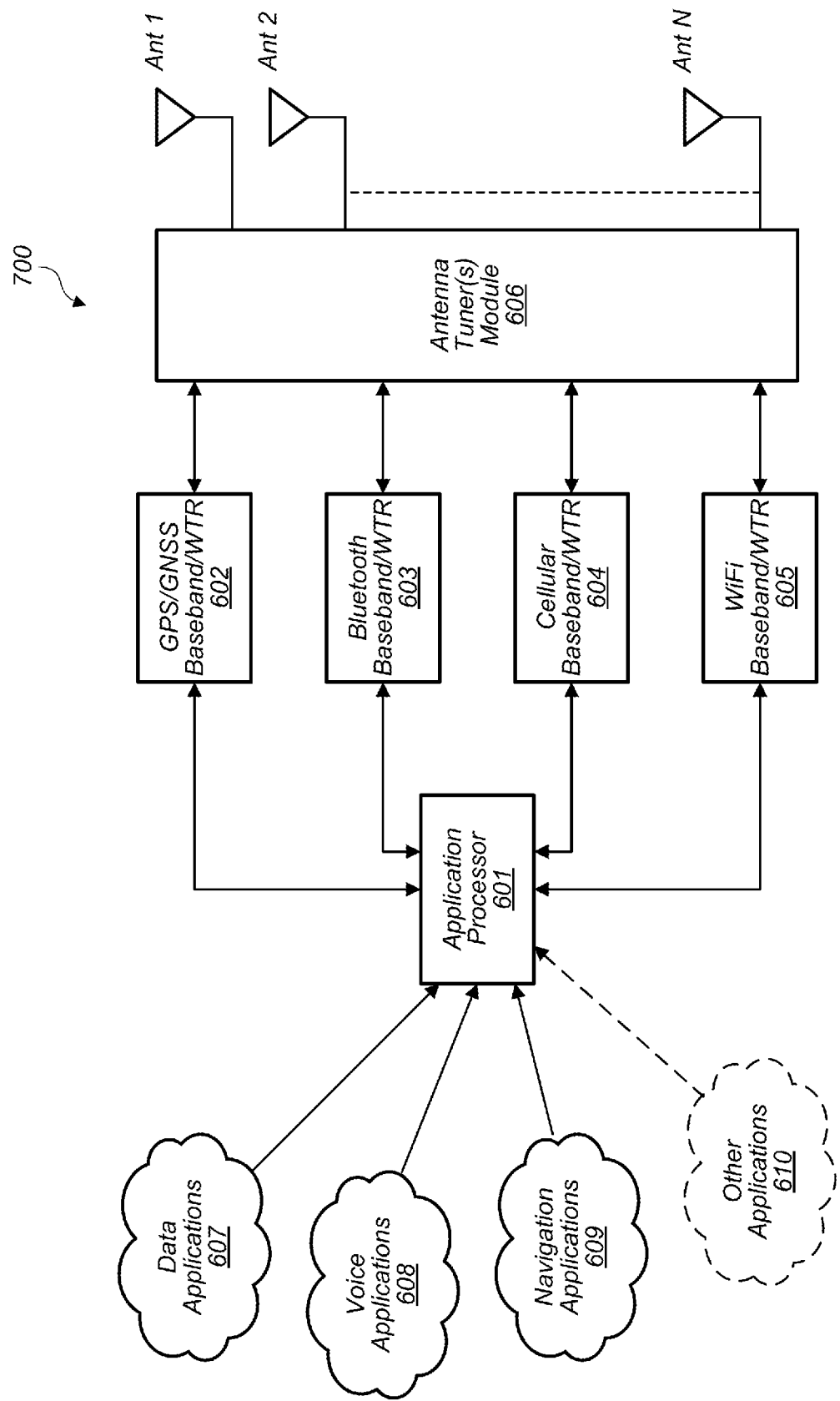
FIG. 6 shows a more detailed exemplary (and simplified) system diagram of a UE with an antenna tuning mechanism, according to some embodiments.
Figure 7:
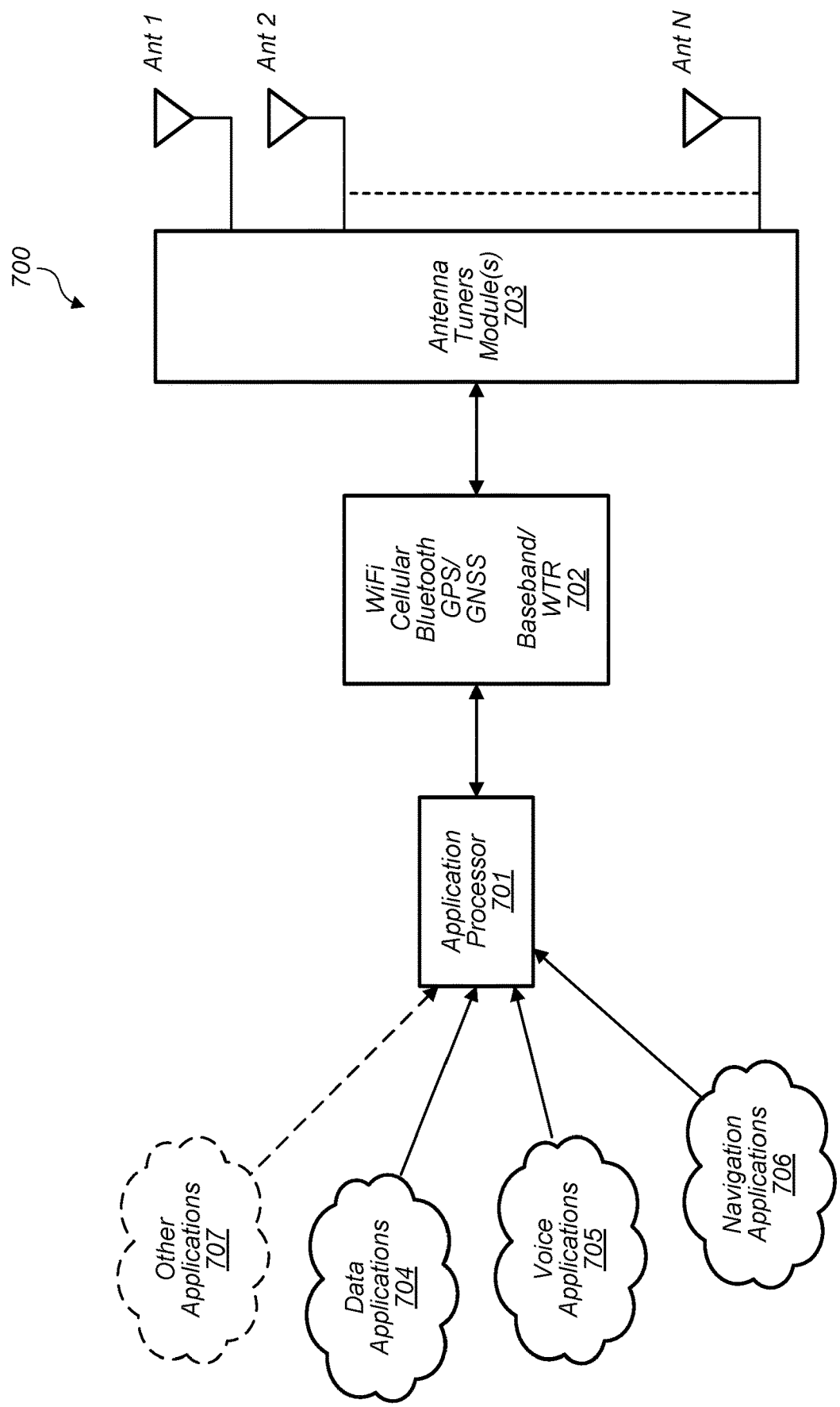
FIG. 7 shows a more detailed exemplary (and simplified) system diagram of a UE with an antenna tuning mechanism and a monolithic baseband component, according to some embodiments.

FIGS. 6-7—Exemplary UE Embodiments with Adaptive Antenna Tuning

As previously described above, FIG. 3B shows an exemplary, simplified system diagram of a UE with an adaptive antenna tuning mechanism, according to some embodiments. FIG. 6 shows a more detailed exemplary, simplified system diagram of a UE with an adaptive antenna tuning mechanism, according to some embodiments. It should be noted that FIGS. 6 through 7 are intended to show a high level architecture to illustrate the pertinent structural elements used for antenna tuning. Accordingly, the organization of various components is illustrated to best highlight an overall underlying structure that may be used to perform antenna tuning according to the various embodiment of an antenna tuning control mechanism as disclosed herein. In FIG. 6, the high level architecture 600 of wireless communication device 106 includes an application processor which may support various applications, for example data applications 607, voice applications 208, navigation applications 609, BLUETOOTH™ applications and other applications as collectively illustrated by other applications 610. UE 106 may also include individual baseband and wireless transceiver (WTR) circuitry for each wireless technology supported by UE 106, such as GPS/GNSS baseband/WTR 602, BLUETOOTH™ baseband/WTR 603, cellular Baseband/WTR 604 and Wi Fi baseband/WTR 605, as examples shown in high level architecture 600. All the baseband(s)/WTR(s) may communicate with application processor 601 to receive the configuration information (antenna-tuner setting or tuner-device settings) for the antenna tuner(s) module/circuit 606. Accordingly, the baseband(s)/WTR(s) may communicate with antenna tuner(s) module 606, which may set a respective tuner configuration for each individual antenna (for example of antenna(s) 335, in reference to FIG. 3, here illustrated as antennas Ant 1, Ant 2, . . . Ant N) based on the configuration received from the baseband(s)/WTR(s) modules. Of course various embodiments may include more or fewer baseband/WTR circuits/modules based on the number of different supported RATs.

FIG. 7 shows a more detailed exemplary (and simplified) system diagram of a UE with an antenna tuning mechanism and a monolithic baseband component, according to some embodiments. In the exemplary UE architecture 700 shown in FIG. 7, an application processor 701 may again support/execute various different types of applications that may be associated with different types of data traffic and or services, for example data application(s) 704, voice application(s) 705, navigation application(s) 706, BLUETOOTH™ and other application(s) represented as other application(s) 707. Application processor 701 may communicate with a single (combined) baseband/WTR component/circuit/functional block to notify the baseband component 702 of the tuner-settings for the antenna tuner(s) configuration for antenna tuning module 703. Baseband/WTR 702 may therefore communicate with antenna tuner(s) module 703 to provide the tuning information used by antenna tuner module(s) 703 to tune each individual antenna (Ant 1 through Ant N) of to UE 106 based on the configuration information (or tuner-setting(s)) received from baseband/WTR 702.

Antenna Tuning Considerations

As previously mentioned, when a wireless communication device operates using multiple wireless radio frequencies and multiple technologies concurrently, with shared antenna(s), the antenna(s) may be either tuned for one particular frequency/band depending on the respective priorities given to the wireless technologies and/or frequencies (first scenario), or the antennas may be tuned to middle frequency/bands such that the antenna efficiency may be penalized to some extent for most or all bands (second scenario). In the first scenario above, antenna efficiency is optimized for the particular band/frequency or wireless technology for which the antenna is tuned. However, the antenna efficiency for the other bands or frequencies or technologies is thereby compromised, with the extent to which the operation is compromised depending on the frequencies or band of operation. In the second scenario above, the antenna(s) are tuned to obtain optimum performance for all active frequencies/bands/technologies, which may actually degrade the antenna efficiency to some extent for most or all bands when compared with the best possible antenna performance that may be achieved through the antennas' respective tuners.

For example, for a wireless communication device, the antenna efficiency of LTE Band 12 (737 MHz) may be −4 dB when tuned with first antenna-tuner values corresponding to Band 12 (i.e., antenna-tuner values providing best efficiency for Band 12 operation). For the same wireless communication device, the antenna efficiency of Wi-Fi 5 GHz may be −4 dB when the antenna(s) are tuned with second antenna-tuner values corresponding to Wi-Fi 5 GHz (i.e., antenna-tuner values providing best efficiency for Wi-Fi operation). If both technologies are active simultaneously, for the first scenario described above, the antenna(s) would be either tuned to LTE Band 12 or Wi-Fi 5 GHz. If they are tuned for LTE B12 using the first antenna-tuner values, then antenna efficiency for Band 12 will be the best achievable efficiency for this particular device, for example −4 dB, while the antenna efficiency for Wi-Fi 5 GHz is degraded by a certain amount, for example by 10 dB, as the first antenna-tuner values do not represent optimal tuner-setting(s) for Wi-Fi 5 GHz band operation. Similar or possibly worse outcome may be expected for LTE Band 12 performance when the antenna(s) are tuned with the second antenna-tuner values corresponding to Wi-Fi 5 GHz operation. For the second scenario described above, assume the antenna(s) are tuned with third antenna-tuner values corresponding to mid-frequency band (MB) operation. Such tuning would degrade the antenna efficiency for both LTE Band 12 and Wi-Fi 5 GHz compared to the respective efficiencies associated with the corresponding antenna-tuner values, i.e. compared to the efficiency for LTE Band 12 when using the first antenna-tuner values, and compared to the efficiency of Wi-Fi 5 GHz when using the second antenna-tuner values. In both cases the wireless performance may be degraded to some extent, independent of RF conditions, of applications being used and of priority of the applications.

Adaptive Application-Based Antenna Tuning

Pursuant to the above, there is room for improvement in antenna tuning for efficient operation, especially to prevent degraded performance leading to undesirable user experiences which may include dropped calls or unsatisfactory calls. Accordingly, in some embodiments, an improved, adaptive antenna tuning approach may be based on applications presently running on a wireless communication device. Such adaptive, application-based antenna tuning may be based on a combination of the applications presently running on the device, the wireless technology supporting the applications, and the radio frequency environment for the wireless technologies supporting the applications. For example, in case of a VoLTE call during single component carrier operation (in which case the antenna(s) may be tuned to the frequency band supporting the VoLTE call), if the UE is operating in a better RF environment than required for uninterrupted and good quality communications, and if the GPS signal is very weak, then the antenna(s) may be tuned using antenna-tuner-settings corresponding to GPS operation to obtain significant improvement in antenna efficiency in comparison with using antenna-tuner-settings used for the frequency band supporting the VoLTE call.

Figure 8:
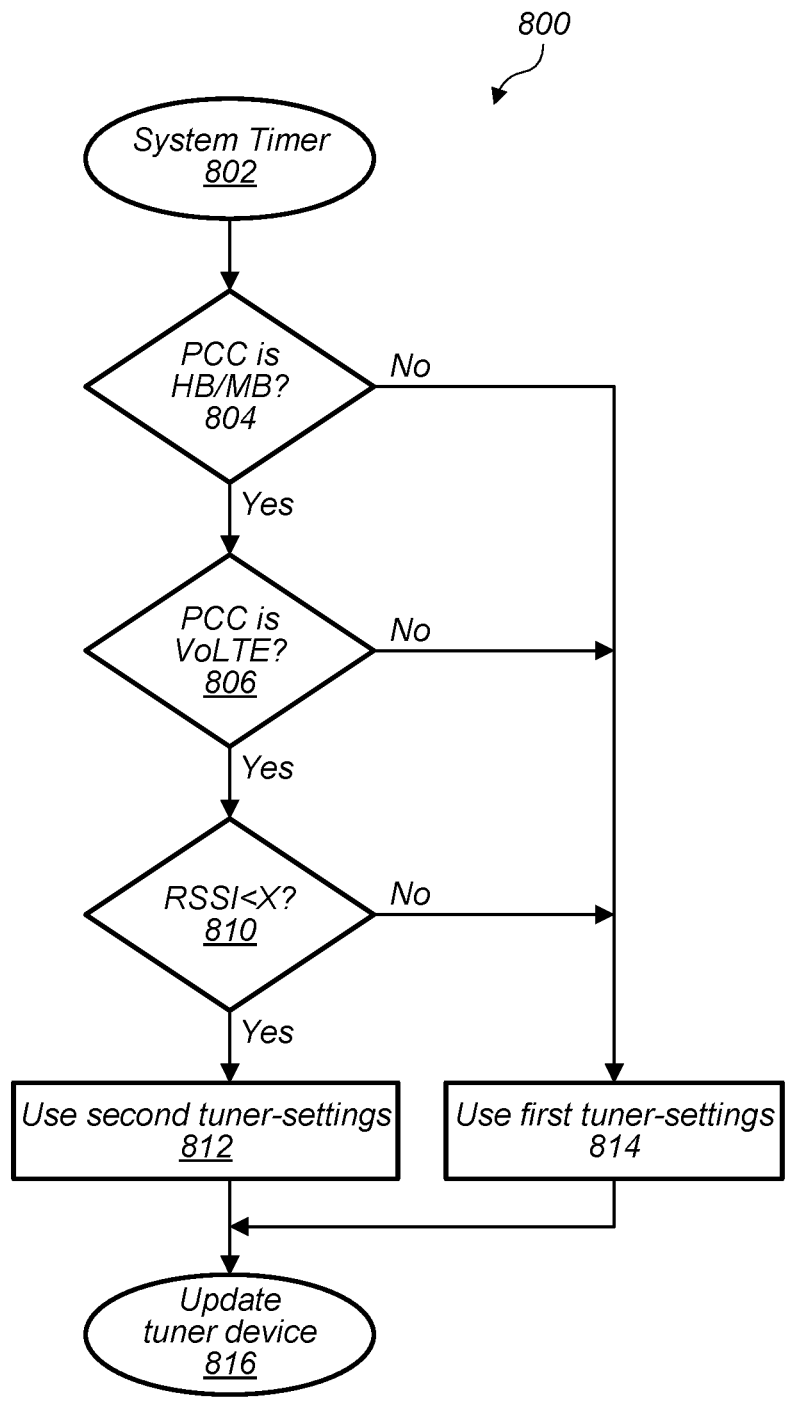
FIG. 8 shows a high-level flowchart illustrating an exemplary method for antenna tuning in a UE, according to some embodiments.

Therefore, in some embodiments, a new antenna tuning system and method (for example, antenna tuning algorithm) may be used to improve the operating efficiency of UEs. A control mechanism in the device may be implemented to determine the antenna-tuner-settings. In some embodiments the control mechanism may be implemented as part of an RF driver (which may be a software driver), used to control RF and hardware components in a front-end path (including the antenna matching circuits) of the device. FIG. 8 shows an exemplary high-level flowchart corresponding to the operation of the antenna tuning control mechanism, according to some embodiments. As shown in FIG. 8, the control mechanism may use a system timer to trigger an application programming interface (API) function that monitors and updates the antenna RF tuner device (802). In some embodiments, the timer may be on the order of 100 ms to 1 s. Within the antenna tuning algorithm and code flow, the driver may have access to information about the operating modes (which may be associated with certain identified services being used, for example VoLTE, data traffic, etc.), the operating (frequency) bands (for example, LB, MB or HB), and the signal strength indicators (for example, RSSI, RSRP, etc.) The antenna tuning control mechanism may determine the antenna-tuner-settings (or values) based on the obtained information, specifically the various combination of applications/services, frequency bands and operating conditions, to maintain efficient and reliable device operation, resulting in improved user experience. This ensures that antenna tuning takes into account the application(s)/service(s) presently running on the device in addition to other factors, considering the combination of application(s)/service(s) and operating frequency bands and signal conditions.

The adaptive antenna tuning flow may thereby optimize performance based on a detection of specific operating modes and conditions, for example the detection of specified user scenarios, as illustrated in flow diagram 800 of FIG. 8. The system timer may trigger a periodic operating mode/condition check, for example via an API call, or API check, at prescribed intervals (802). The call or check may identify an operating frequency range of the PCC, for example whether or not the PCC is operating in a MB/HB frequency band (804), and may use a first antenna-tuner-setting (or first tuner-settings) for tuning the antenna(s) if the PCC operating frequency range is not within a specified range, for example it is not within MB/HB (814). Otherwise, the API call or check identifies the data traffic mode of the PCC, for example whether the PCC is operating in VoLTE mode (e.g. when VoLTE services are using the PCC; 806), and may use the first antenna-tuner-setting for tuning the antenna(s) if the PCC is not operating in a specified data traffic mode, for example if the PCC is not operating in VoLTE mode (e.g. when VoLTE services are not using the PCC; 814). Otherwise, the API call or check may identify the signal conditions, for example whether the RSSI (receiver signal strength indicator) is below certain threshold, for example −95 dBm (810), and may use the first antenna-tuner-setting if the signal conditions are not within specified limits, for example if the RSSI is below the threshold (814). Otherwise, the API call or check may use a second antenna-tuner-setting or second set of antenna-tuner-device settings, for example settings that are specific (or corresponding) to the identified operating mode or combination of application/service/operating condition(s) or user scenario (812). Once the tuner-device settings have been selected (either 812 or 814), the tuner device may be updated with the selected settings (816).

Figure 9:
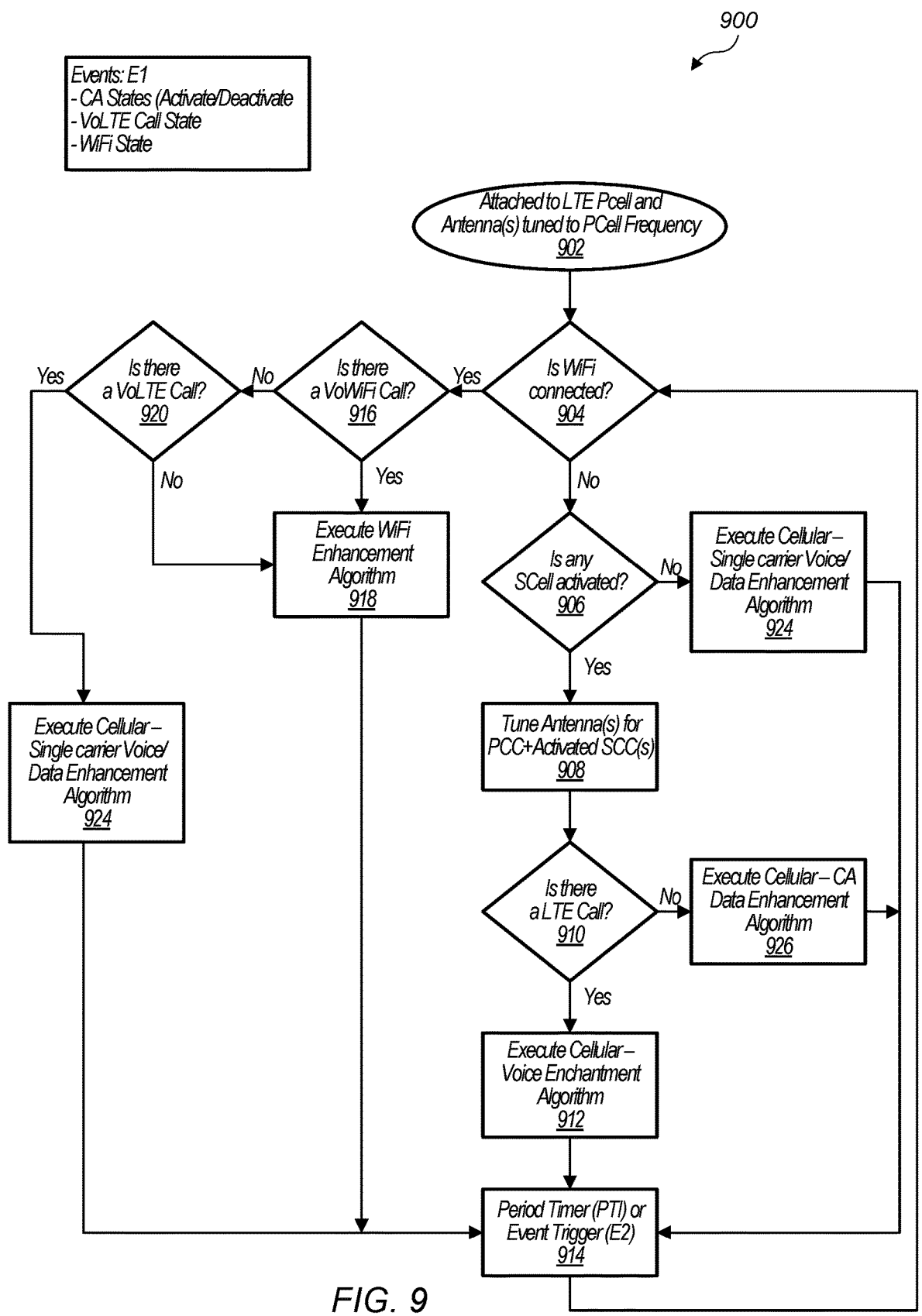
FIG. 9 shows a more detailed flowchart illustrating an exemplary method for application-based antenna tuning in a UE, according to some embodiments.
Figure 10:
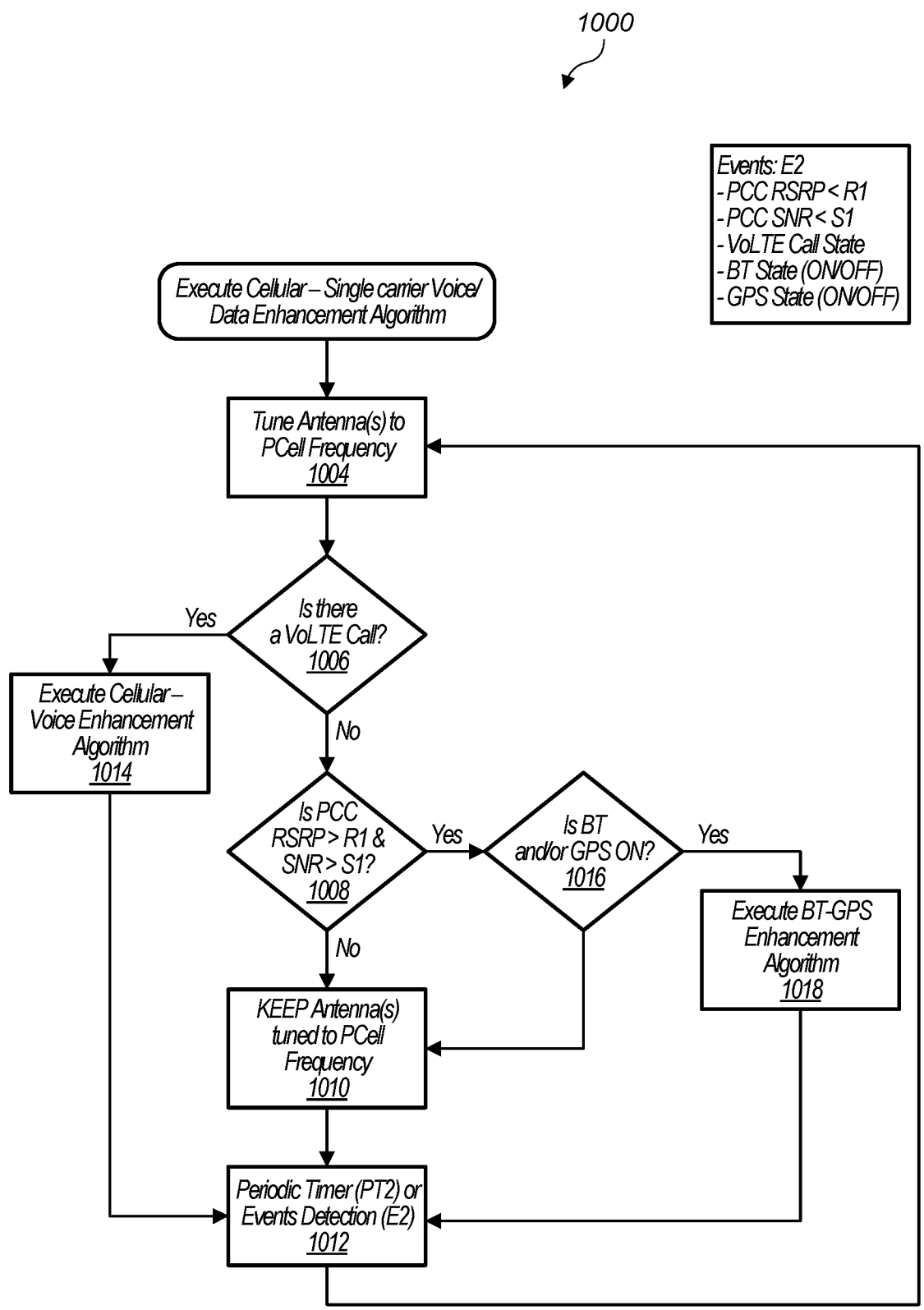
FIG. 10 shows a flowchart illustrating an exemplary method for application-based antenna tuning in a UE for cellular single carrier operating mode, according to some embodiments.
Figure 11:
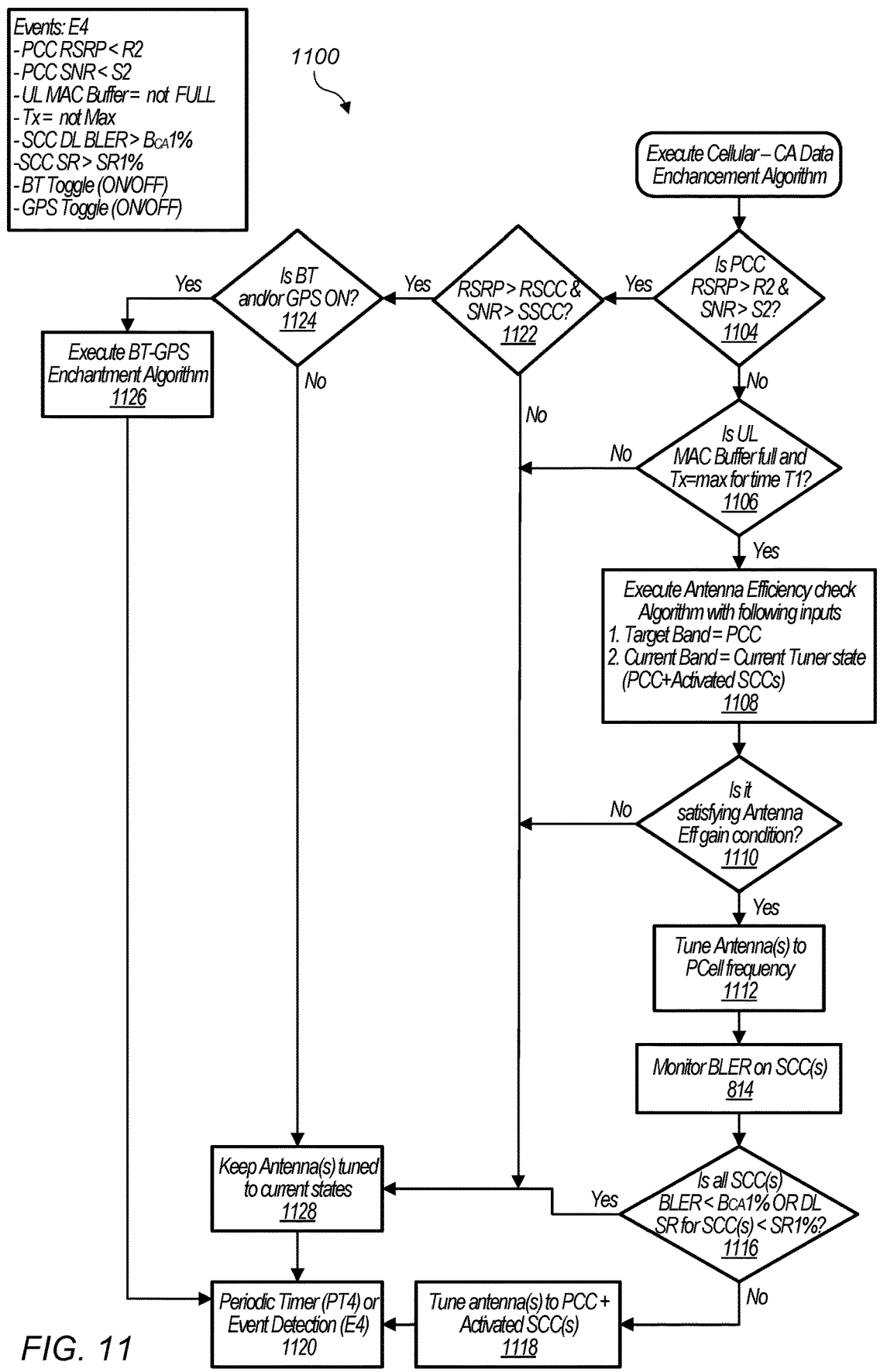
FIG. 11 shows a flowchart illustrating an exemplary method for application-based antenna tuning in a UE, for cellular carrier aggregation (multiple bands/frequencies) operating mode without active voice call, according to some embodiments.
Figure 12:
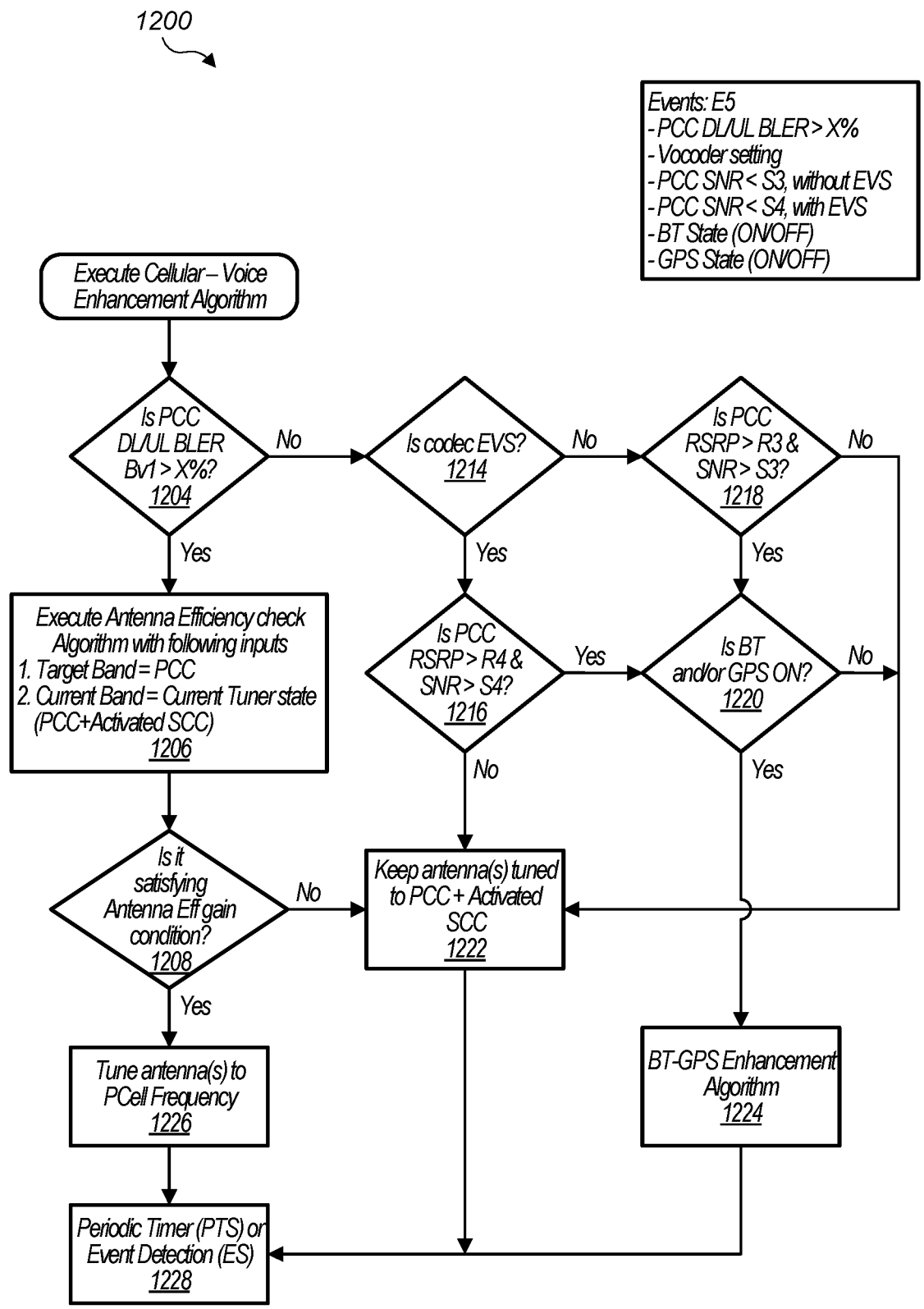
FIG. 12 shows a flowchart illustrating an exemplary method for application-based antenna tuning in a UE, for cellular (single/multiple bands/frequencies) operating mode with active voice call, according to some embodiments.
Figure 13:
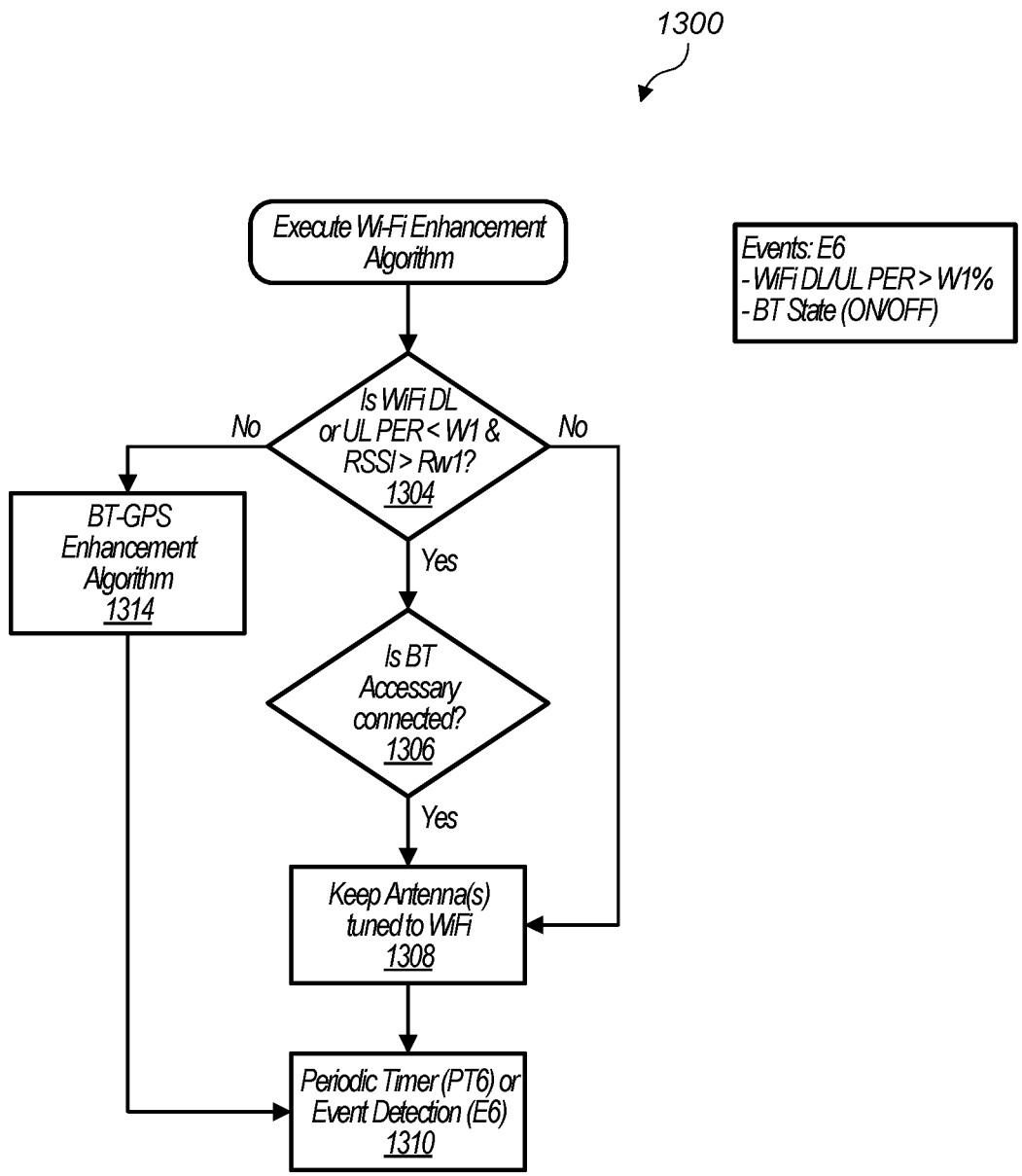
FIG. 13 shows a flowchart illustrating an exemplary method for application-based antenna tuning in a UE, for Wi-Fi operating mode, according to some embodiments.
Figure 14:
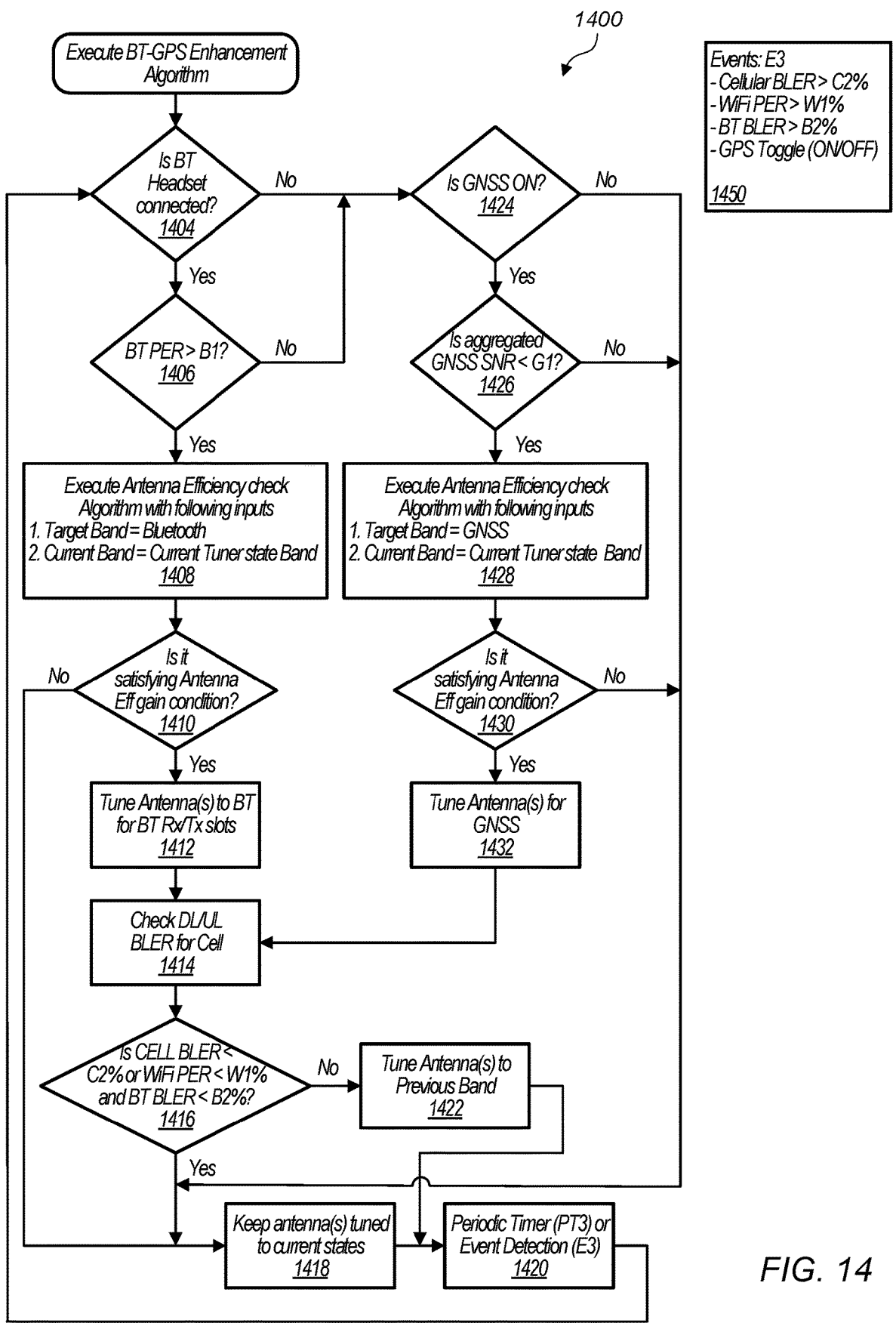
FIG. 14 shows a flowchart illustrating an exemplary method for application-based antenna tuning in a UE, for BLUETOOTH™ and GPS/GNSS operating mode, according to some embodiments.
Figure 15:
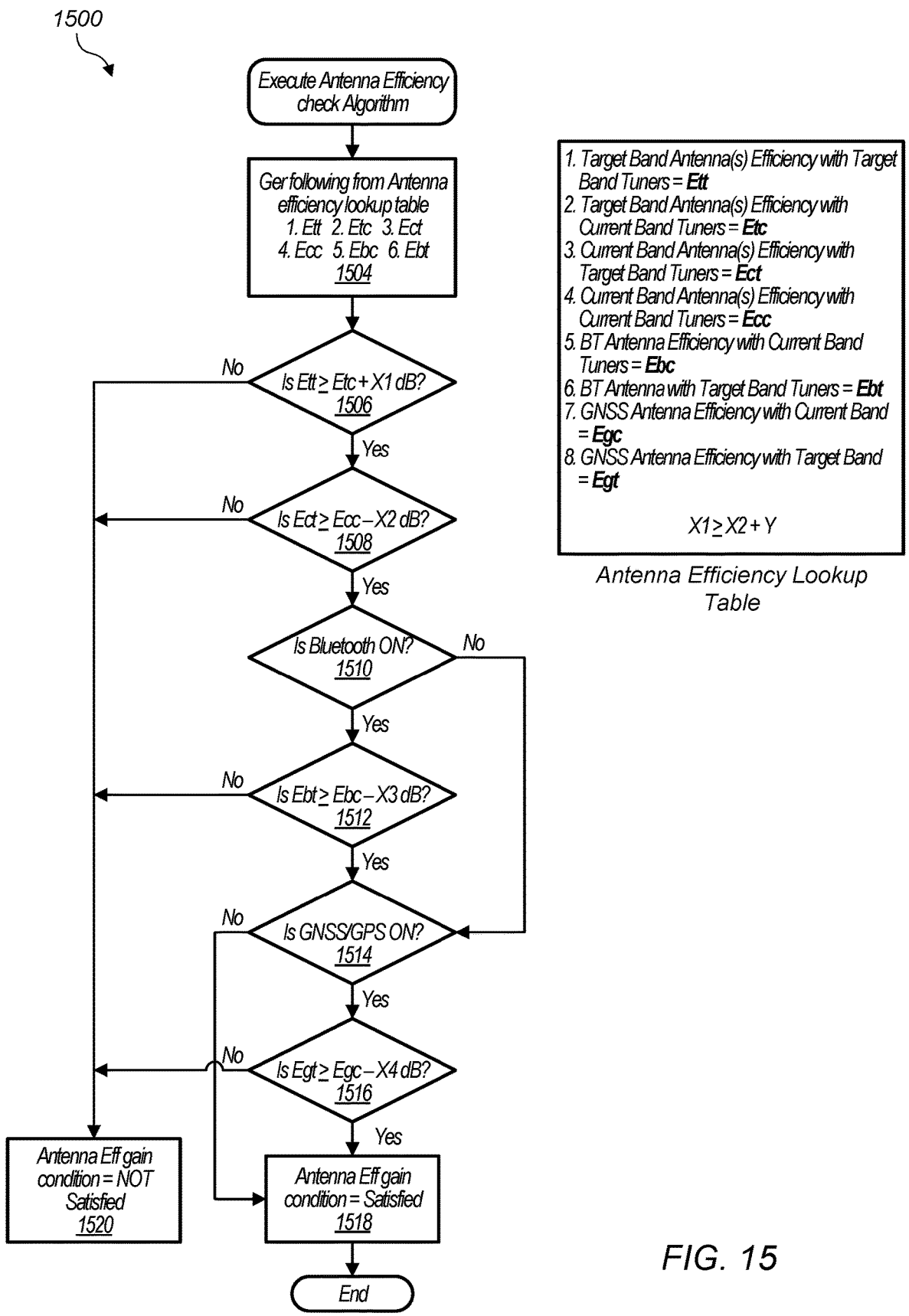
FIG. 15 shows a flowchart for an exemplary antenna-efficiency-check algorithm in a UE, according to some embodiments.

FIGS. 9 through 14 show exemplary flowcharts for application-based antenna tuning in a UE according to various different embodiments related to the high-level flow diagram shown in FIG. 8. Specifically, FIG. 9 shows a more detailed exemplary flowchart for application-based antenna tuning in a UE. FIG. 10 shows an exemplary flowchart for application-based antenna tuning for cellular single carrier operating mode. FIG. 11 shows an exemplary flowchart for application-based antenna tuning for cellular carrier aggregation (multiple bands/frequencies) operating mode without active voice call. FIG. 12 shows an exemplary flowchart for application-based antenna tuning for cellular (single/multiple bands/frequencies) operating mode with active voice call. FIG. 13 shows an exemplary flowchart for application-based antenna tuning for Wi-Fi operating mode. FIG. 14 shows an exemplary flowchart for application-based antenna tuning for BLUETOOTH™ and GPS/GNSS operating mode. Finally, FIG. 15 shows an exemplary flowchart for an antenna-efficiency-check algorithm, according to some embodiments. The following describe various aspects related to and detailing the different flowcharts described above.

Flowchart 900 begins with the consideration that the wireless communication device is attached (connected) with a cellular wireless system, for example with a Cellular Wireless system LTE (902). Although the examples in various ones of the flow diagrams disclosed herein are provided with respect to LTE, the algorithms are equally applicable to similar cellular wireless systems, for example to 5G-NR cellular systems and/or any other systems in which voice calls are conducted via packet data transmissions. Therefore, while in the example of FIG. 9 cellular technologies refer to either LTE (Long Term Evolution) or LTE-A (Long Term Evolution—Advance), FIG. 9 is not intended to limit the scope to these two cellular technologies and may be equally applicable to other cellular technologies, such as 5G-NR for example, as mentioned above. The main algorithm may include sub-algorithms based on the applications and wireless technology being used. The main algorithm 900, may use a sub-algorithm 924 (single carrier voice/data enhancement algorithm) detailed as algorithm 1000 in FIG. 10, a sub-algorithm 926 (CA Data Enhancement Algorithm) detailed as algorithm 1100 in FIG. 11, a sub-algorithm 912 (Cellular-Voice Enhancement Algorithm) detailed as algorithm 1200 in FIG. 12, and a sub-algorithm 918 (Wi-Fi Enhancement Algorithm) detailed as algorithm 1300 in FIG. 13. The algorithm 1400 "BT-GPS Enhancement Algorithm", shown in FIG. 14, may be used within or in conjunction with the other algorithms.

Algorithm 900 may also be configured with interrupts corresponding to a periodic timer (PT1) and/or various events. For example, such events may include CA states, VoLTE Call states and/or Wi-Fi States as shown in FIG. 9. For example, an interrupt may be triggered to re-initiate the algorithm if a CA-state change such as "Activation" or "De-activation", etc. is detected, or if a VoLTE call-state change, such as "Call Initiation" or "End Call" or "Drop Call", is detected, or if Wi-Fi state change, such as "Connected" or "Not Connected", is detected.

As shown in FIG. 9, for the scenario where Wi-Fi is not connected ("No" at 904) and a VoLTE call is active with one or more activated SCCs, which means CA is active ("Yes" at 906), the antenna(s) may be tuned for PCC+activated SCC(s) (908). However, in case of a VoLTE call ("Yes" at 910) the VoLTE data packets are received through PCC, and the antenna tuning of 908 might not be the optimum for PCC as previously explained above. Therefore, the "Cellular-Voice Enhancement Algorithm" 912 (detailed algorithm 1200 in FIG. 12) may be executed to tune the antenna(s) for all activated wireless technologies to prioritize the band supporting the voice call (PCC in this example). The period timer or event trigger (914) causes the algorithm 900 to again evaluate if the device is Wi-Fi connected (904).

As illustrated in FIG. 12, for the case when PCC DL and UL BLER (Block Error Rate) is higher than a specified percentage (>X %), the "Antenna Efficiency check Algorithm" 1500 may be executed with inputs as "target band=PCC and current band=PCC+Activated SCC(s)", for this example. The "Antenna Efficiency check Algorithm" 1206 (detailed as algorithm 1500 in FIG. 15) may return values of either "Antenna Efficiency gain condition=NOT Satisfied" or "Antenna Efficiency gain condition=Satisfied", as will be further explained below with respect to FIG. 15. Based on the return value of algorithm 1206, if "Antenna Efficiency gain condition=Satisfied" ("Yes" at 1208), then antenna(s) may be tuned to PCC (1226), and if "Antenna Eff gain condition=Not Satisfied" ("No" at 1208), then the antenna(s) may not be re-tuned and may be kept configured with the existing tuner settings (1222). The antenna(s) may be kept tuned for "PCC+activated SCC(s)" in scenarios where, PCC BLER is not higher than a specified percentage (≤X %) ("No" at 1204), and PCC RSRP is not higher than R4 and PCC SNR is not greater than S4 ("No" at 1216), if the codec for the voice call is "EVS", Enhanced Voice Service, ("Yes" at 1214), or in case where PCC RSRP is not higher than R3 and PCC SNR is not greater than S3 ("No" at 1218), if the codec for the voice call is "non-EVS" ("No" at 1214). The antenna(s) may also be kept configured with the same tuner settings (1222) if PCC RSRP is greater than both R3 & R4, and SNR is greater than both S3, S4, ("Yes" at 1216 and 1218) and GPS & BLUETOOTH™ are OFF ("No" at 1220).

The "Antenna Efficiency check Algorithm" 1206 (detailed as algorithm 1500 in FIG. 15) may be executed before retuning the antenna(s) to a desired band/frequency, to determine if the expected gain in antenna efficiency is significant enough to improve the performance of active application(s) with higher priority, and at the same time to ensure that it may not degrade performance of other active wireless technologies or bands or frequencies by more than corresponding specified metric thresholds. The "Antenna Efficiency check algorithm" 1500 may operate to check the efficiency of any antenna tuning settings. In the exemplary depiction in FIG. 15, algorithm 1500 may operate based on two inputs, a "current band" (settings) and a "target band" (settings). In other words, the algorithm 1500 may be used to check/determine the efficiency of the tuner settings for a current band versus the efficiency of the tuner settings for a target band. The current band refers to a band or band combination to which the antenna(s) are presently tuned, while target band refers to a band or band combination to which the antenna(s) may be tuned to improve the efficiency, and hence the performance. The "antenna efficiency check algorithm" may use a lookup table which contains antenna efficiency information of all bands with all applicable tuner settings to perform various checks (1504).

As shown in FIG. 15, the antenna(s) may be tuned to a target band (1518, indicating that the antenna efficiency gain conditions are satisfied for changing the tuning to a target band) if Ett (antenna efficiency of target band using target band tuner settings) is higher than Etc (antenna efficiency of target band using current band tuner settings)+offset (X1 dB) ("Yes" at 1506) and Ect (antenna efficiency of current band using target band tuner settings) is higher than Ecc (antenna efficiency of current band using current band tuner settings)—offset (X1 dB) ("Yes" at 1508), and there are no active BLUETOOTH™ and GPS connections ("No" at 1510 and at 1514, respectively). In case BLUETOOTH™ and/or GPS is active ("Yes" at 1510 and/or at 1514, respectively), then the antenna efficiency gain conditions are satisfied when Ebt (antenna efficiency of BLUETOOTH™ with target band tuner states) is no less than Ebc (antenna efficiency of BLUETOOTH™ with current band tuner states)—Offset (X3) ("Yes" at 1512), and/or Egt (antenna efficiency of GPS with target band tuner states) is no less than Egc (antenna efficiency of GPS with current band tuner states)—Offset (X4) ("Yes" at 1516). For the remaining scenarios, the antenna efficiency gain conditions are not satisfied (1520), and the antenna(s) may remain tuned to the current band(s).

Referring now to FIG. 12, in "cellular-voice enhancement algorithm" 1200, the condition of PCC DL/UL BLER being less than a specified percentage (<X %) ("No" at 1204), and PCC RSRP being higher than R3 while SNR is higher than S3 ("Yes" at 1218) and PCC RSRP being higher than R4 while SNR is higher than S4 ("Yes" at 1216) for non-EVS ("No" at 1214) and EVS ("Yes" at 1214) codec voice calls may be considered an indication of the device operating under LTE RF conditions that meet the requirements to sustain the voice call without compromising quality. In such scenarios, BLUETOOTH™ and GPS performance may be enhanced by executing a "BT-GPS Enhancement Algorithm" (1224), which is detailed as algorithm 1400 shown in FIG. 14. Algorithm 1400 may be used to improve BLUETOOTH™ and GPS applications performance when other wireless technologies are considered to be operating under conditions that exceed the requirements of the operating conditions considered to support their specific applications. That is, the operating conditions for the other wireless technologies may exceed the requirements for specific applications that use the other wireless technologies, which makes it possible to improve the performance of BLUETOOTH™ and/or GPS applications without adversely affecting the performance of those specific applications. Therefore, in such instances, tuning the antenna for other than those wireless technologies would not cause any degradation in the performance of applications running on the UE and supported by those other wireless technologies.

The example shown in flowchart 1400 gives BLUETOOTH™ higher priority than GPS, as GPS enhancement may be activated when BLUETOOTH™ is OFF or is experiencing better than necessary operating conditions. However, this prioritization may be reversed and GPS may be prioritized over BLUETOOTH™ if so desired. As shown in FIG. 14, if BLUETOOTH™ is connected ("Yes" at 1404) and BT PER (BLUETOOTH™ packet error rate) is higher than a specified percentage (>B1%) ("Yes" at 1406) and "antenna efficiency gain condition" (as previously explained above) is satisfied ("Yes" at 1410) with the inputs being the current band (bands to which the antenna(s) are currently tuned) and target band (BLUETOOTH™ for this case), then the antenna(s) may be tuned for BLUETOOTH™ frequency (1412). However, the antenna tuners may be kept configured for BLUETOOTH™ (1418) until some event (E3) interruption at the expiry of the periodic Timer (PT3) (1420). If BLUETOOTH™ is either OFF ("No" at 1404) or SNR is higher than necessary, and if GPS is ON ("Yes" at 1424) and aggregated SNR is less than G1 ("Yes" at 1426) and "antenna efficiency gain condition" (as previously explained above) is satisfied ("Yes" at 1430) with inputs of a current band (bands to which antenna(s) are currently tuned) and a target band (GPS in this case), then the antenna(s) may be tuned for GPS frequency (1432). Antenna retuning to BLUETOOTH™ or GPS may not be required if the BLUETOOTH™ PER is less than the specified percentage (<B1%) ("No" at 1406) and GPS aggregated SNR is higher than G1 dB ("No" at 1426) or if "antenna efficiency gain condition" is not satisfied ("No" at 1430). The interrupt events shown in FIG. 14 (performing a check, 1414) may include cellular BLER (if higher than C2%), Wi-Fi PER (if higher than W1%), BLUETOOTH™ BLER (if higher than B2%), and GPS state (if toggled Off↔On) (1416, also as indicated in 1450.

Referring again to FIG. 9, for the scenario when Wi-Fi is not connected ("No" at 904) and LTE-A is active without a VoLTE call ("Yes" at 906), the antenna(s) may be tuned for PCC+Activated SCC(s) (908). However, the UL may be tied to PCC, and to PCC+SCC(s) for SCC(s) which support UL CA. In such cases the running application may be considered UL centric and the UL performance may be compromised if the antenna(s) are tuned to PCC+Activated SCC(s). Therefore, the UL performance may be improved by using algorithm "CA Data Enhancement Algorithm" (926, detailed as algorithm 1100 shown in FIG. 11).

Referring now to FIG. 11, it may be determined whether an application needs better UL performance based on the TX power (transmit power of the UE) and the MAC UL buffer. The MAC UL buffer helps determine the amount of transmit data (i.e. the data to be transmitted) in the pipeline or in the buffer. If PCC RSRP is less than "R2" and SNR is less than"S2" ("No" at 1104) and TX power is maximum and the MAC UL Buffer is full ("Yes" at 1106) and if "Antenna efficiency gain condition" is satisfied ("Yes" at 1110) with inputs of a current band (bands to which antenna(s) are currently tuned) and a target band (PCC in this case) (1108), then the antenna(s) may be tuned to PCC (1112). By tuning the antenna(s) to the PCC frequency, the UL BLER may be reduced, UL path-loss may be reduced, and hence overall performance may be significantly improved. However, if the PCC RF conditions are already better, such that PCC RSRP is greater than R2 and SNR is greater than S2 ("Yes" at 1104), and similarly SCC RF conditions are better, such that RSRP is greater than RSCC and SNR greater than SSCC ("Yes" at 1122), then BLUETOOTH™ and/or GPS performance may be improved by executing the "BT-GPS Enhancement Algorithm" (1126, detailed as algorithm 1400 in FIG. 14) if BLUETOOTH™ and/or GPS are active or being used by some application ("Yes" at 1124). There may be some scenarios where antenna retuning may not be needed, for example when PCC RF conditions are good but RSRP is less than RSCC and SNR is less than SSCC ("No" at 1122), or if PCC RSRP is less than "R2" and SNR is less than"S2" ("No" at 1104) and TX power is not at maximum or the MAC buffer is not full ("No" at 1106) or "Antenna eff gain condition" is not satisfied ("No" at 1110) or PCC and SCC(s) RF conditions are good and BLUETOOTH™ and GPS are not active or not being used by any application. There may be a periodic timer and several events which may re-initiate the algorithm to have this evaluation performed continuously (see 1120). Examples of such events are listed in table "Events: E4" in FIG. 11, and may include PCC RSRP being greater than R2, PCC SNR becoming less than S2, UL MAC Buffer becoming empty or partially filled, TX power not reaching maximum level, SCC DL BLER becoming greater than BCA1%, SCC SR becoming greater than SR1%, BLUETOOTH™ toggling (ON↔OFF), and/or GPS toggling (ON↔OFF).

As also shown in FIG. 9, for a scenario where Wi-Fi is not connected ("No" at 904) and the device is connected to LTE (single carrier) which may have SCC(s) configured ("No" at 906), the BLUETOOTH™ and GPS performance may be improved by invoking algorithm "cellular-single carrier voice/data enhancement" (924; illustrated in more detail as algorithm 1000 shown in FIG. 10). Referring to FIG. 10, BLUETOOTH™ and/or GPS performance may be improved by executing the "BT-GPS enhancement" algorithm 1314 (illustrated in more detail as algorithm 1400 in FIG. 14) if PCC RSRP is better than R1 dBm and SNR is better than S1 dB ("Yes" at 1008) in case of application(s) using data, BLUETOOTH™ and/or GPS ("Yes" at 1016). In case of a voice call application for such a scenario ("Yes" at 1006), the BLUETOOTH™ and/or GPS performance may be improved by executing the "cellular-voice enhancement" algorithm (1014; detailed as algorithm 1200 in FIG. 12). Several events or a periodic timer (PT2) may serve as interrupts (1012), such as PCC RSRP becoming less than R1, SNR becoming less than S1, state changes in VoLTE call, BLUETOOTH™ or GPS, etc., as illustrated in table "Events: E2" in FIG. 10.

As further illustrated in FIG. 9, a scenario where Wi-Fi is connected ("Yes" at 904) and VoWiFi calling is also active ("Yes" at 916), then the "Wi-Fi enhancement" algorithm may be executed (918; detailed as algorithm 1300 in FIG. 13). Referring to FIG. 13, the "BT-GPS enhancement" algorithm may be executed (1314; detailed as algorithm 1400 in FIG. 14) to improve BLUETOOTH™ performance. Referring back to FIG. 9, the Wi-Fi enhancement algorithm 1300 may also be executed (918) for the scenario where Wi-Fi is in a "connected" state ("Yes" at 904) but VoWiFi is either not active or not supported ("No" at 916) and VoLTE is not active ("No" at 920). A periodic timer (PT1) or certain events (as shown in FIG. 9) may be used as interrupts (914) to reevaluate the conditions once the "Wi-Fi enhancement" algorithm has been executed (918) as previously explained above. In a scenario where VoLTE is active ("Yes" at 920) and Wi-Fi is also connected ("Yes" at 904), the BLUETOOTH™ and GPS performance may be improved by executing the "single carrier voice/data enhancement" algorithm (924; detailed as algorithm 1000 shown in FIG. 10).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium (for example, a non-transitory memory element) may be configured so that it stores program instructions and/or data, where the program instructions, if executed by a computer system, cause the computer system to perform a method, for example any of a method embodiments described herein, or, any combination of the method embodiments described herein, or, any subset of any of the method embodiments described herein, or, any combination of such subsets.

In some embodiments, a device (for example, a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. An apparatus comprising:
a processor configured to cause a device to:
conduct wireless communications using one or more antennas shared among a plurality of different wireless radio access technologies (RATs), wherein each different RAT of the plurality of different RATs is associated with corresponding operating frequency bands;
identify:
one or more applications running on the wireless communication device;
for each application of the one or more applications, which respective RATs of the plurality of RATs support the application; and
for each application, which respective one or more operating frequency bands of the corresponding operating frequency bands are used by the application;
check an efficiency of current antenna tuning settings to determine whether an expected gain in antenna efficiency warrants retuning the one or more antennas; and
in response to the determining that retuning the one or more antennas is warranted, retune the one or more antennas based on a combination of:
a respective type of each application;
the respective RATs being used by each application;
the respective one or more operating frequency bands used by each application; and
respective signal conditions associated with the one or more frequency bands used by each application.

2. The apparatus of claim 1, wherein the processor configured to further cause the device to conduct the wireless communications using carrier aggregation;
wherein the corresponding operating frequency bands include primary component carriers and secondary component carriers in the carrier aggregation.

3. The apparatus of claim 2, wherein the processor is configured to further cause the device to:
determine, for each application, whether the respective one or more operating frequency bands used by the application include primary component carriers; and
retune the one or more antennas further based on whether the respective one or more operating frequency bands used by the application include primary component carriers.

4. The apparatus of claim 3, wherein the processor is configured to further cause the device to:
retune the one or more antennas according to first tuner-settings in the event of one or more of the following:
a frequency band of the primary component carrier is not within a specified frequency range;
the primary component carrier is not used by any applications of a specific type; or
a receive signal strength indicator at the wireless communication device is not below a specified threshold; and
retune the one or more antennas according to second tuner-settings in the event of:
the frequency band of the primary component carrier is within the specified frequency range;
the primary component carrier is used by an application of the specific type; and
the receive signal strength indicator at the wireless communication device is below the specified threshold.

5. The apparatus of claim 4, wherein the application of the specific type is a voice-over-cellular-data application.

6. The apparatus of claim 1, wherein the processor is configured to further cause the device to check the efficiency of current antenna tuning settings periodically.

7. The apparatus of claim 6, wherein the processor is configured to further cause the device to check the efficiency of current antenna tuning settings periodically according to timing based on one or more of:
a system timer; or
one or more interrupt events.

8. The apparatus of claim 1, wherein the respective type of the application corresponds to:
a real-time voice call;
a real-time video call;
a real-time data transfer; or
a non-real-time data.

9. A device including:
radio circuitry communicatively coupled to one or more antennas shared among a plurality of different wireless radio access technologies (RATs) to facilitate wireless communications of the device, wherein each RAT of the plurality of RATS is associated with corresponding operating frequency bands; and
a processor communicatively coupled to the radio circuitry and configured to:
identify:
one or more applications running on the wireless communication device;

for each application of the one or more applications, which respective RATs of the plurality of RATs support the application; and for each application, which respective one or operating frequency bands of the corresponding operating frequency bands are used by the application;

check an efficiency of current antenna tuning settings to determine whether an expected gain in antenna efficiency warrants retuning the one or more antennas; and in response to the determining that retuning the one or more antennas is warranted, retune the one or more antennas based on a combination of:

a respective type of each application;

the respective RATs being used by each application;

the respective one or more operating frequency bands used by each application; and respective signal conditions associated with the one or more frequency bands used by each application.

10. The device of claim 9, wherein the processor configured to further cause the device to conduct the wireless communications using carrier aggregation, wherein the corresponding operating frequency bands include primary component carriers and secondary component carriers in the carrier aggregation.

11. The device of claim 10, wherein the processor is configured to further cause the device to:

determine, for each application, whether the respective one or more operating frequency bands used by the application include primary component carriers; and retune the one or more antennas further based on whether the respective one or more operating frequency bands used by the application include primary component carriers.

12. The device of claim 11, wherein the processor is configured to further cause the device to:

retune the one or more antennas according to first tuner-settings in the event of one or more of the following:

a frequency band of the primary component carrier is not within a specified frequency range;

the primary component carrier is not used by any applications of a specific type; or a receive signal strength indicator at the wireless communication device is not below a specified threshold; and retune the one or more antennas according to second tuner-settings in the event of:

the frequency band of the primary component carrier is within the specified frequency range;

the primary component carrier is used by an application of the specific type; and the receive signal strength indicator at the wireless communication device is below the specified threshold.

13. The device of claim 9, wherein the processor is configured to further cause the device to check the efficiency of current antenna tuning settings periodically.

14. The device of claim 13, wherein the processor is configured to further cause the device to check the efficiency of current antenna tuning settings periodically according to timing based on one or more of:

a system timer; or one or more interrupt events.

15. A non-transitory memory element storing instructions executable by a processor to cause a device to:

conduct wireless communications using one or more antennas shared among a plurality of different wireless radio access technologies (RATs), wherein each different RAT of the plurality of different RATs is associated with corresponding operating frequency bands;

identify:

one or more applications running on the wireless communication device;

for each application of the one or more applications, which respective RATs of the plurality of RATs support the application; and for each application, which respective one or more operating frequency bands of the corresponding operating frequency bands are used by the application;

check an efficiency of current antenna tuning settings to determine whether an expected gain in antenna efficiency warrants retuning the one or more antennas; and in response to the determining that retuning the one or more antennas is warranted, retune the one or more antennas based on a combination of:

a respective type of each application;

the respective RATs being used by each application;

the respective one or more operating frequency bands used by each application; and respective signal conditions associated with the one or more frequency bands used by each application.

16. The non-transitory memory element of claim 15, wherein the instructions are executable by the processor to further cause the device to conduct the wireless communications using carrier aggregation, wherein the corresponding operating frequency bands include primary component carriers and secondary component carriers in the carrier aggregation.

17. The non-transitory memory element of claim 16, wherein the instructions are executable by the processor to further cause the device to determine, for each application, whether the respective one or more operating frequency bands used by the application include primary component carriers; and retune the one or more antennas further based on whether the respective one or more operating frequency bands used by the application include primary component carriers.

18. The non-transitory memory element of claim 17, wherein the instructions are executable by the processor to further cause the device to:

retune the one or more antennas according to first tuner-settings in the event of one or more of the following:

a frequency band of the primary component carrier is not within a specified frequency range;

the primary component carrier is not used by any applications of a specific type; or a receive signal strength indicator at the wireless communication device is not below a specified threshold; and retune the one or more antennas according to second tuner-settings in the event of:

the frequency band of the primary component carrier is within the specified frequency range;

the primary component carrier is used by an application of the specific type; and the receive signal strength indicator at the wireless communication device is below the specified threshold.

19. The non-transitory memory element of claim 15, wherein the instructions are executable by the processor to further cause the device to check the efficiency of current antenna tuning settings.

20. The non-transitory memory element of claim 15, wherein the instructions are executable by the processor to further cause the device to check the efficiency of current antenna tuning settings periodically according to timing based on one or more of:
   a system timer; or
   one or more interrupt events.

\* \* \* \* \*

UNITED STATES PATENT AND TRADEMARK OFFICE
CERTIFICATE OF CORRECTION

| | | |
|---|---|---|
| PATENT NO. | : 11,218,181 B2 | Page 1 of 1 |
| APPLICATION NO. | : 16/356986 | |
| DATED | : January 4, 2022 | |
| INVENTOR(S) | : Dongchang Yu et al. | |

It is certified that error appears in the above-identified patent and that said Letters Patent is hereby corrected as shown below:

In the Claims

Column 29, Line 15, delete "RATS" and insert --RATs--.

Signed and Sealed this
Twenty-third Day of May, 2023

Katherine Kelly Vidal
*Director of the United States Patent and Trademark Office*